(12) United States Patent
Mitsuhashi et al.

(10) Patent No.: US 8,224,099 B2
(45) Date of Patent: Jul. 17, 2012

(54) SCREEN DATA TRANSMITTING SYSTEM, SCREEN DATA TRANSMITTING SERVER, SCREEN DATA TRANSMITTING METHOD AND PROGRAM RECORDING MEDIUM

(75) Inventors: Akitake Mitsuhashi, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 321 days.

(21) Appl. No.: 12/665,775

(22) PCT Filed: Jun. 27, 2008

(86) PCT No.: PCT/JP2008/061712
§ 371 (c)(1),
(2), (4) Date: Mar. 4, 2010

(87) PCT Pub. No.: WO2009/004996
PCT Pub. Date: Jan. 8, 2009

(65) Prior Publication Data
US 2010/0322523 A1 Dec. 23, 2010

(30) Foreign Application Priority Data

Jun. 29, 2007 (JP) .................................. 2007-172069
May 26, 2008 (JP) .................................. 2008-137156

(51) Int. Cl.
*G06K 9/68* (2006.01)
*G06F 15/16* (2006.01)
(52) U.S. Cl. ........................................ 382/218; 709/219
(58) Field of Classification Search ...................... None
See application file for complete search history.

(56) References Cited

U.S. PATENT DOCUMENTS

| 7,881,369 B2 * | 2/2011 | Murai et al. ............. 375/240.01 |
| 2004/0095601 A1 * | 5/2004 | Ozawa ......................... 358/1.15 |
| 2007/0245021 A1 * | 10/2007 | Ohtsuka et al. ............... 709/225 |
| 2011/0293190 A1 * | 12/2011 | O'Callaghan ................. 382/197 |

FOREIGN PATENT DOCUMENTS

| JP | 61-252784 A | 11/1986 |
| JP | 8-84331 A | 3/1996 |
| JP | 8-223430 A | 8/1996 |
| JP | 10-290447 A | 10/1998 |
| JP | 2006246153 A | 9/2006 |
| JP | 2007025073 A | 2/2007 |

OTHER PUBLICATIONS

International Search Report for PCT/JP2008/061712 mailed Sep. 22, 2008.

* cited by examiner

*Primary Examiner* — Li Liu

(57) ABSTRACT

A difference region extracting section 122 extracts differential regions based on screen data of a previous screen stored in transmission screen data storage section 124 and a current screen stored in a screen data storage section 121. A priority determining section 123 calculates change data density indicating a degree of a change of pixel values for every differential region. For example, when a user operates an icon on the screen, the change data density of the differential region corresponding to the icon becomes larger than the change data density of the differential region corresponding to the background portion of a video image. An encoding section 125 writes screen code data of each differential region in a transmission buffer 141 in descending order of the change data density.

35 Claims, 32 Drawing Sheets

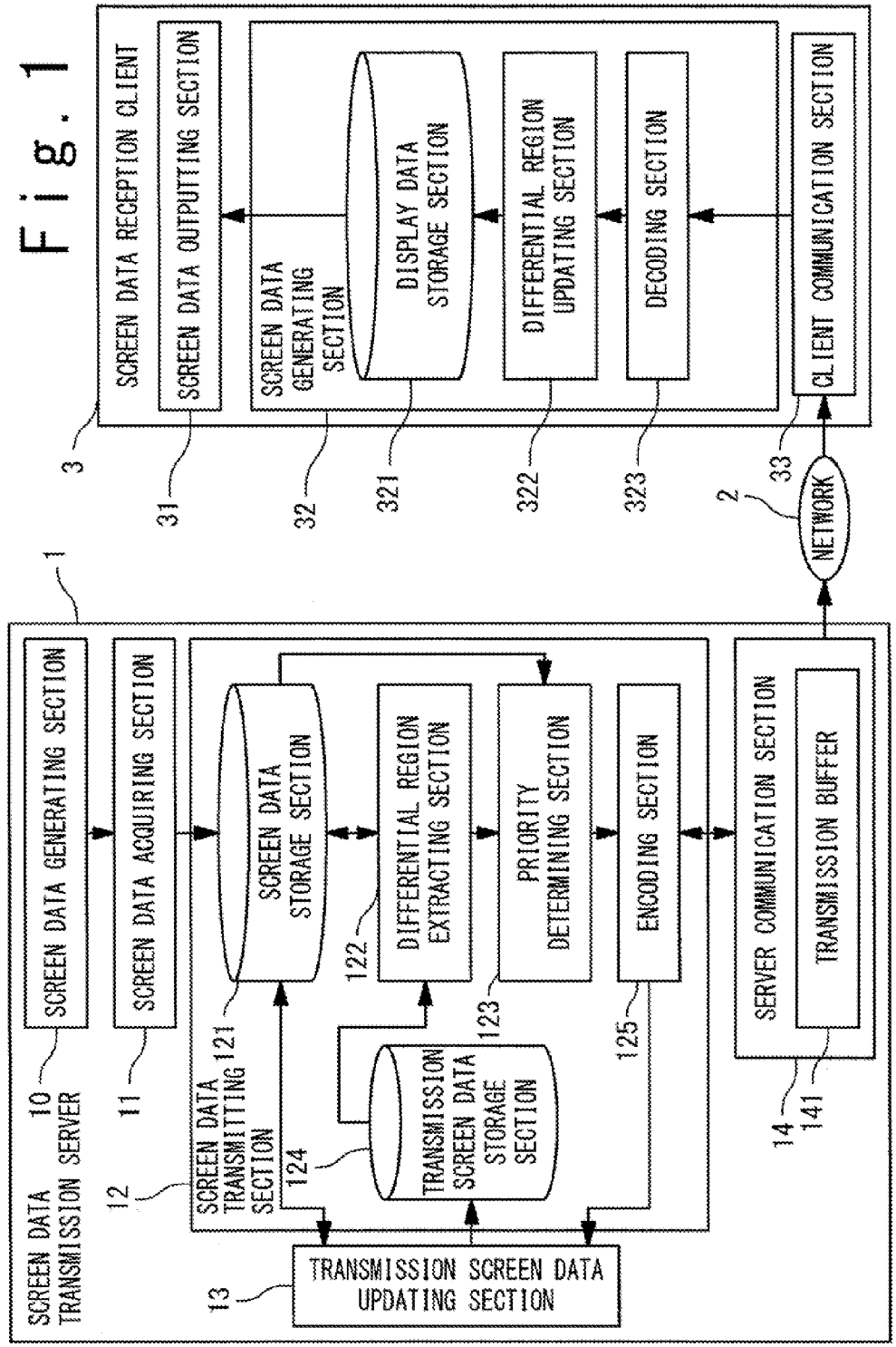

41: SCREEN DATA 43

44: SCREEN DATA

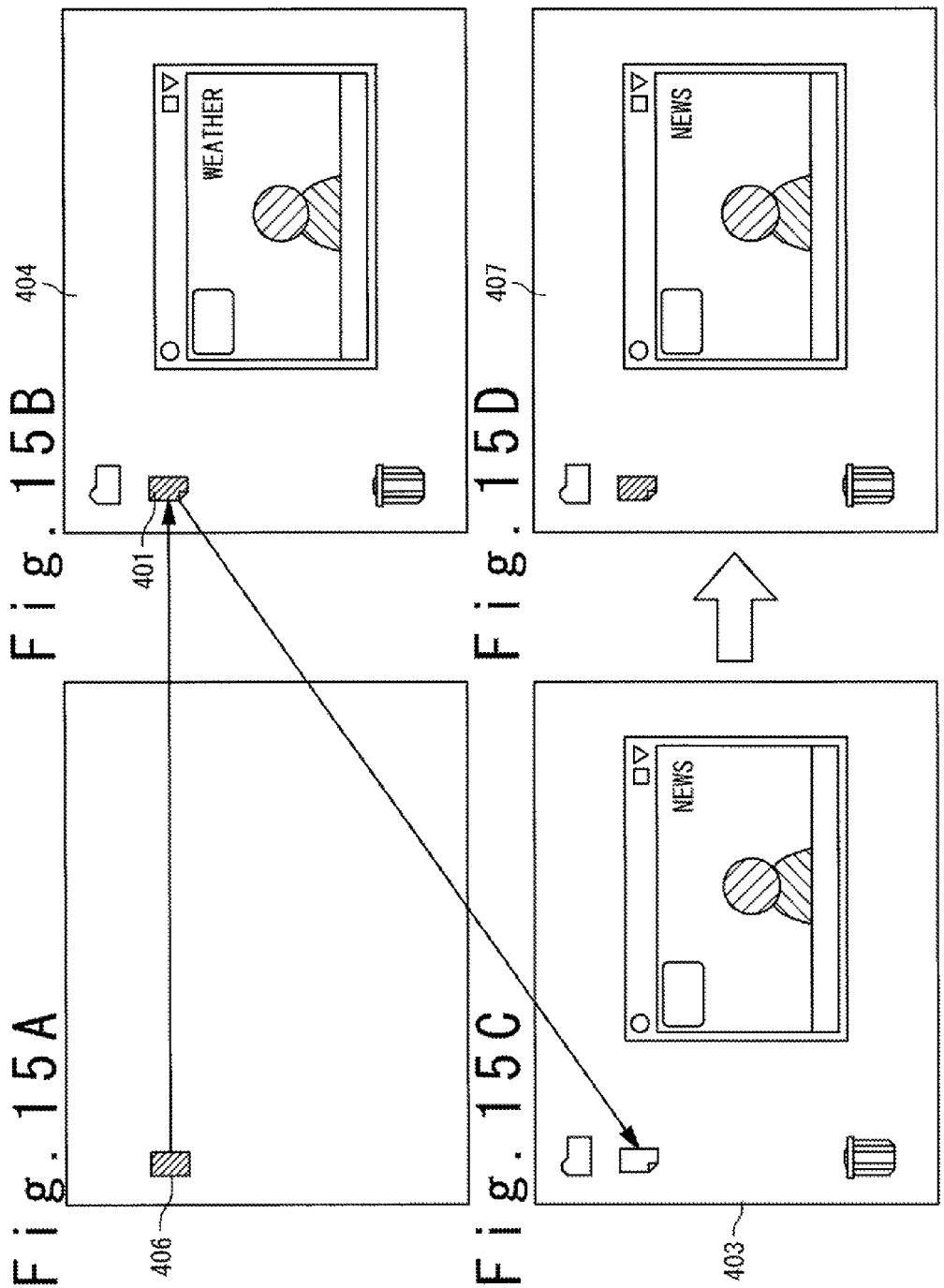

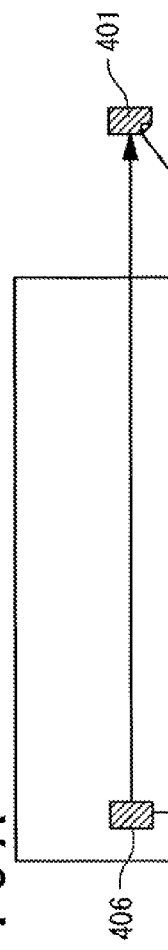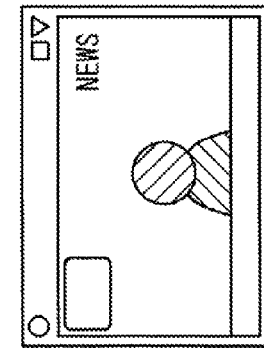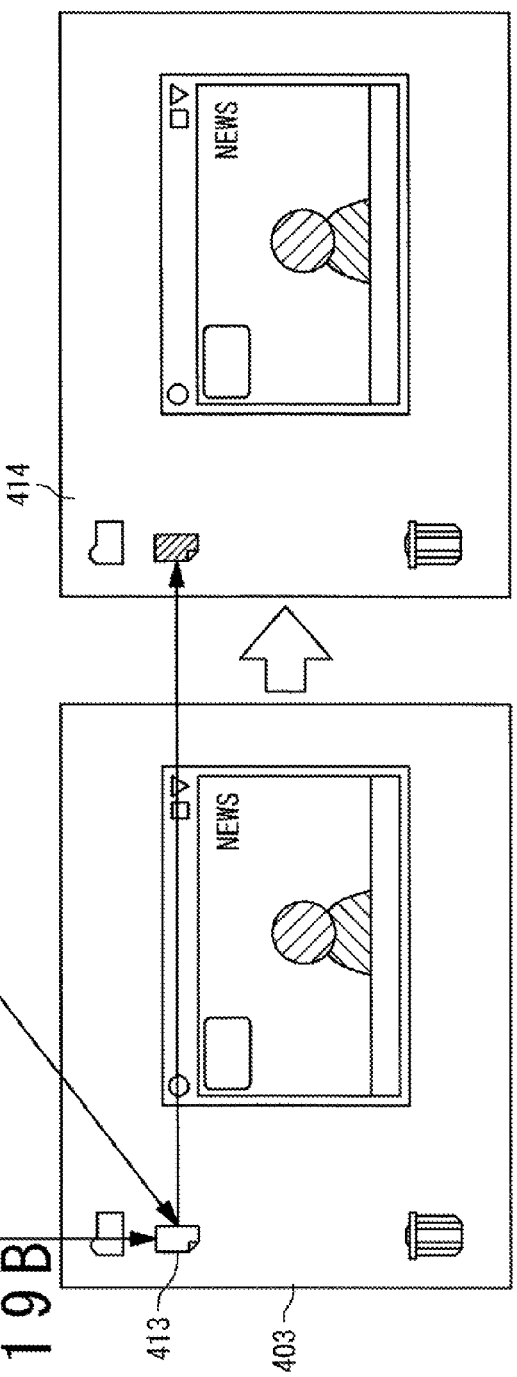

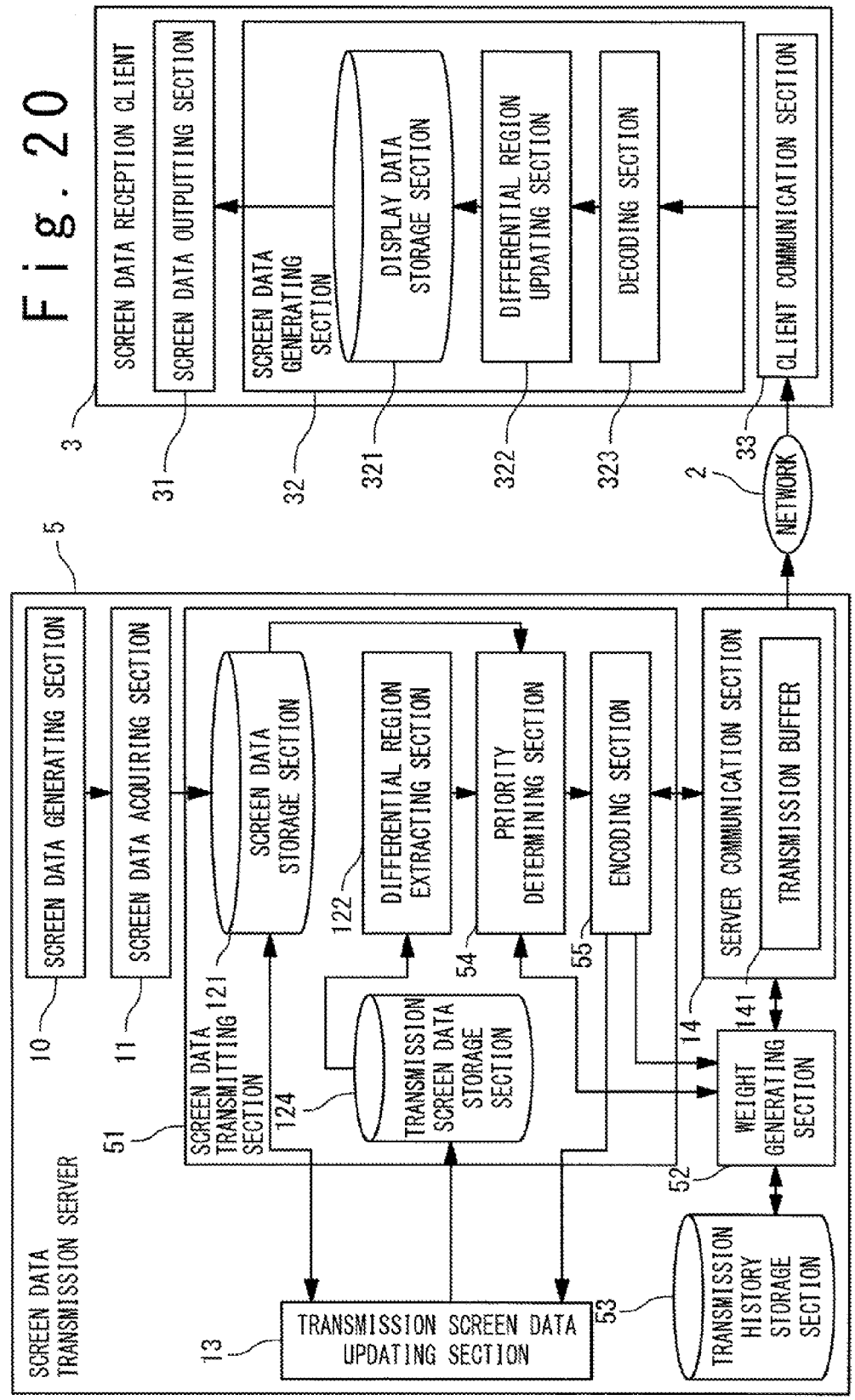

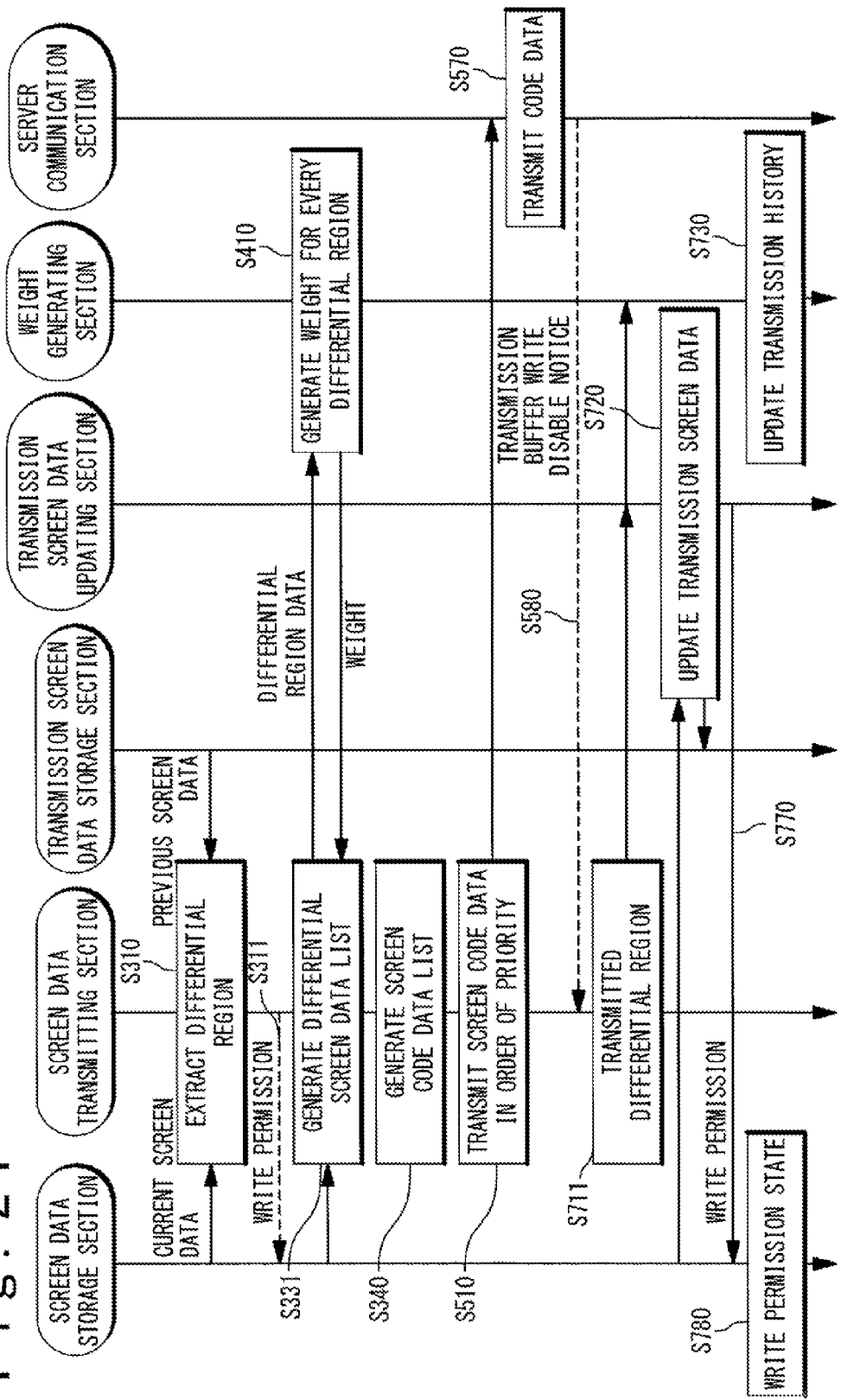

415

| BLOCK NAME | LATEST TRANSMISSION TIME |
|---|---|
| A | |
| B | |
| C | |
| D | |
| E | |
| F | |
| G | |
| H | |
| I | |

| BLOCK NAME | LATEST TRANSMISSION TIME |
|---|---|
| A | 2007/03/21 13:02:05 |
| B | 2007/03/21 13:02:05 |
| C |  |
| D | 2007/03/21 13:02:05 |
| E | 2007/03/21 13:02:05 |
| F |  |
| G | 2007/03/21 13:02:05 |
| H |  |
| I |  |

| BLOCK NAME | LATEST TRANSMISSION TIME |
|---|---|
| A | 2007/03/21 13:02:05 |
| B | 2007/03/21 13:02:30 |
| C | 2007/03/21 13:02:30 |
| D | 2007/03/21 13:02:05 |
| E | 2007/03/21 13:02:30 |
| F | 2007/03/21 13:02:30 |
| G | 2007/03/21 13:02:05 |
| H | 2007/03/21 13:02:30 |
| I | 2007/03/21 13:02:30 |

| BLOCK NAME | LATEST TRANSMISSION TIME |
|---|---|
| A | 2007/03/21 13:02:05 |
| B | 2007/03/21 13:02:30 |
| C | 2007/03/21 13:02:30 |
| D | 2007/03/21 13:02:05 |
| E | 2007/03/21 13:02:30 |
| F | 2007/03/21 13:02:30 |
| G | 2007/03/21 13:02:05 |
| H | 2007/03/21 13:02:30 |
| I | 2007/03/21 13:02:30 |

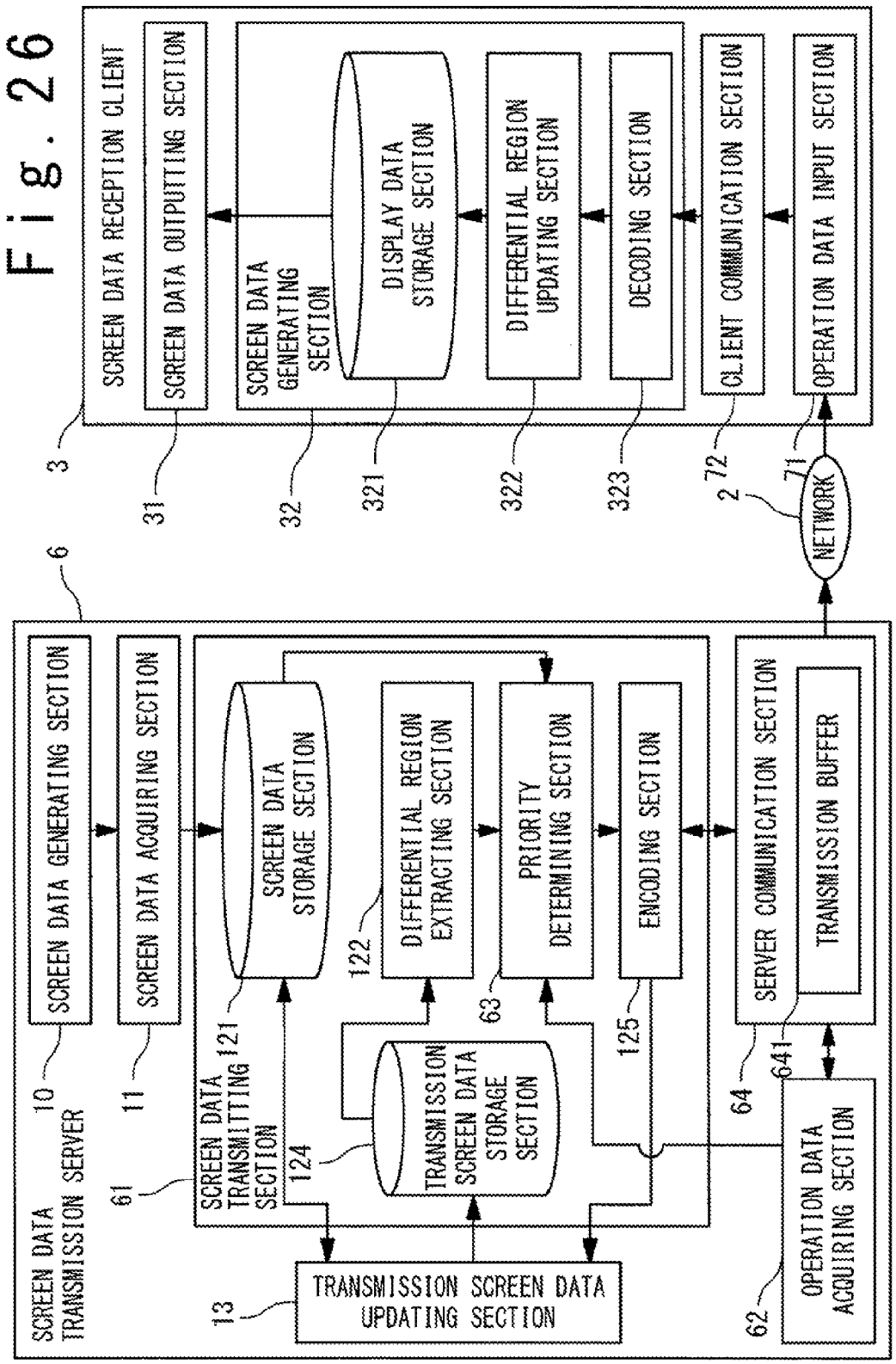

SCREEN DATA TRANSMITTING SYSTEM, SCREEN DATA TRANSMITTING SERVER, SCREEN DATA TRANSMITTING METHOD AND PROGRAM RECORDING MEDIUM

The present application is the National Phase of PCT/JP2008/061712, filed Jun. 27, 2008, which claims a priority on convention based on Japanese Patent Application No. 2007-172069 and 2008-137156, and the disclosures of Japanese Patent Application No. 2007-172069 and 2008-137156 are incorporated herein by reference.

TECHNICAL FIELD

The present invention relates to a screen data transmitting technique for reducing a transmission data amount of screen data on a current screen, and in particular, relates to a screen data transmitting system, a screen data transmission server, a screen data transmitting method, and a recoding medium using the screen data transmitting technique.

BACKGROUND ART

When transmitting a screen data, differential screen data for only a difference from a previous screen data is transmitted in order to reduce a transmission data amount. In Japanese Patent Application Publication (JP-A-Showa 61-252784), for example, a differential image data and a position data of a difference are transmitted to a receiver side. In Japanese Patent Application Publication (JP-A-Heisei 8-223430), a differential image data is compressed, and the compressed image data and a position data of a differential region are transmitted to a receiver side.

According to the above-mentioned techniques, a transmission data amount can be reduced compared with a case where image data of a current screen is entirely transmitted. However, even when only a differential image data is transmitted, it is difficult to transmit the entire of differential image data if a communication band is narrow. In these techniques, such a situation is not considered and measures to such a situation are not taken.

On the other hand, a technique for performing monitoring easily with a little work amount is known in a monitoring system having a plurality of imaging units and a plurality of image displaying units. For example, Japanese Patent Application Publication (JP-A-Heisei 10-290447) discloses a technique in which temporal change of an output image data in data size is determined for each imaging unit, and the image data outputted from the imaging unit with a greater temporal change is displayed in an emphasis compared with the image data outputted from the imaging unit with a smaller temporal change. However, the technique disclosed in Japanese Patent Application Publication (JP-A-Heisei 10-290447) is not a technique for transmitting a differential image data.

DISCLOSURE OF INVENTION

An object of the present invention is to provide a screen data transmitting system, a screen data transmission server, and a screen data transmitting method for transmitting a screen data while reducing an influence on screen update to a minimum.

According to an aspect of the present invention, a screen data transmitting system includes a screen data transmission server and a screen data reception client. The screen data transmission server includes a differential region extracting section, a priority determining section, and a communication section. The differential region extracting section compares a previous screen and a current screen, and extracts as differential regions, regions on the current screen having changed from the previous screen. When the differential regions are extracted by the differential region extracting section, the priority determining section determines a priority in transmission of an image data for each of the differential regions based on predetermined criteria. The communication section transmits the image data to the screen data reception client in descending order of the priority of differential regions decided by the priority determining section. The screen data reception client synthesizes a screen data based on the image data received from the screen data transmission server and displays the synthesized screen data on a client screen.

According to another aspect of the present invention, a screen data transmission server has a differential region extracting section, a priority determining section, and a communication section. The differential region extracting section compares a precious screen and a current screen, and extracts as differential regions, regions on the current screen having changed from the previous screen. When the differential regions are extracted by the differential region extracting section, the priority determining section determines a priority in transmission of an image data for each of the differential regions based on predetermined criteria. The communication section transmits the image data in descending order of the priority of differential regions decided by the priority determining section.

According to another aspect of the present invention, a screen data transmitting method includes a differential region extracting step, a priority determining step, a communication step. In the differential region extracting step, a previous screen and a current screen are compared and regions on the current screen having changed from the previous screen are extracted as differential regions. In the priority determining step, a priority in transmission of an image data of each of the differential regions is determined for each of the differential regions extracted in the differential region extracting step, based on predetermined criteria. In the communication step, the image data are transmitted in descending order of the priority of differential regions decided in the priority determining step.

According to still another aspect of the present invention, a program recording medium stores a program for making a computer function as a differential region extracting section, a priority determining section, and a communication section. The differential region extracting section compares a previous screen and a current screen, and extracts as differential regions, regions on the current screen having changed from the previous screen. The priority determining section determines a priority in transmission of an image data of each of the differential regions extracted by the differential region extracting section, based on predetermined criteria. The communication section transmits the image data in descending order of the priority of differential regions decided by the priority determining means.

BRIEF DESCRIPTION OF DRAWINGS

Objects, effects, and characteristics of the above-mentioned invention are more clarified from the description of exemplary embodiments together with the attached drawings.

FIG. 1 is a block diagram showing a configuration example of a screen data transmitting system according to a first exemplary embodiment of the present invention;

FIGS. 15A to 15D are diagrams showing an operation of a transmission screen data updating section;

FIGS. 19A to 19C are diagrams showing the operation of the differential region updating section;

FIG. 20 is a block diagram showing a configuration example of the screen data transmitting system according to a second exemplary embodiment of the present invention;

FIG. 21 is a flow chart showing operation of a screen data transmission server;

FIG. 26 is a block diagram showing a configuration example of the screen data transmitting system according to a third exemplary embodiment of the present invention;

BEST MODE FOR CARRYING OUT THE INVENTION

First Exemplary Embodiment

Figure 2A:
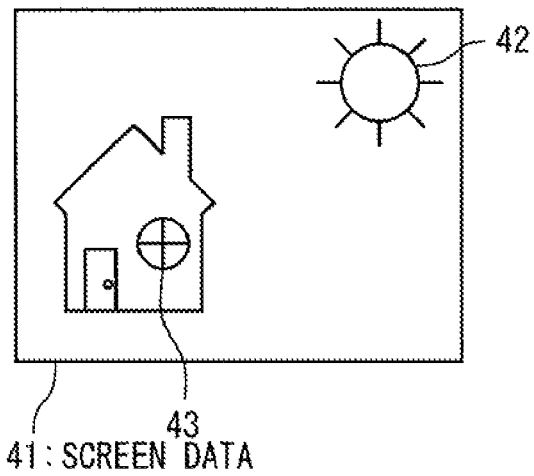
FIGS. 2A to 2C show concepts of differential regions according to the present invention.

A first exemplary embodiment of the present invention will be described in detail with reference to the accompanying drawings. FIG. 1 is a block diagram showing a configuration of a screen data transmitting system according to the present exemplary embodiment. The screen data transmitting system according to the first exemplary embodiment has a screen data transmission server 1 for encoding and transmitting screen data, and a screen data reception client 3 for decoding and displaying encoded screen data. The screen data transmission server 1 and the screen data reception client 3, which are connected through a network 2 such as the Internet, transmit and receive data to and from each other. The screen data transmitted and received between the screen data transmission server 1 and the screen data reception client 3 includes image data indicating each image on a screen. The image data includes pixel data having a coordinate value indicating a position of the image and a pixel value indicating an intensity of each color component.

The screen data transmission server 1 has a screen data generating section 10, a screen data acquiring section 11, a screen data transmitting section 12, a server communication section 14 such as Ethernet (registered trademark), and a transmission screen data updating section 13. The screen data generating section 10 generates a screen data for a screen that is transmitted to the screen data reception client 3 (also, to be referred to as a current screen in some cases). The screen data acquiring section 11 acquires the screen data generated by the screen data generating section 10 and gives the screen data to the screen data transmitting section 12. The screen data transmitting section 12 extracts each of differential regions on the current screen and determines a priority in transmission of the image data of the extracted differential regions. The screen data transmitting section 12 encodes the image data of each differential region and transmits the encoded image data to the screen data reception client 3 through the server communication section 14 in accordance with the priority.

The screen data transmitting section 12 having such functions includes a screen data storage section 121, a differential region extracting section 122, a priority determining section 123, a transmission screen data storage section 124, and an encoding section 125.

The screen data for the current screen is written into the screen data storage section 121 by the screen data acquiring section 11. Additionally, a write control data indicating whether or not data write into the screen data storage section 121 is permitted, is written into the screen data storage section 121 by the transmission screen data updating section 13. The screen data acquiring section 11 can write the screen data for the current screen acquired from the screen data generating section 10 into the screen data storage section 121 when the write control data shows write permission.

A transmission screen data is stored in the transmission screen data storage section 124. The transmission screen data is the latest screen data (screen data for a previous screen) which has been transmitted from the screen data transmission server 1 to the screen data reception client 3. That is to say, the screen data stored in the transmission screen data storage section 124 is a screen data for the screen data reception client 3 to be presumed to display by the screen data transmission server 1.

The differential region extracting section 122 extracts as a differential region, a partial region on a current screen where a mass (cluster) of pixels with pixel values having changed from those of a previous screen is present, based on screen data of the current screen and screen data of the previous screen. The screen data of the current screen is stored in the screen data storage section 121 and the screen data of the previous screen is stored in the transmission screen data storage section 124. A shape of a differential region may be any shape such as a rectangle and a circle. Therefore, when the shape of a differential region is a rectangle, coordinate values at the upper-left and lower-right vertices can be set as a differential region data. The differential region extracting section 122 outputs the differential region data indicating each of the extracted differential regions.

Figure 2B:
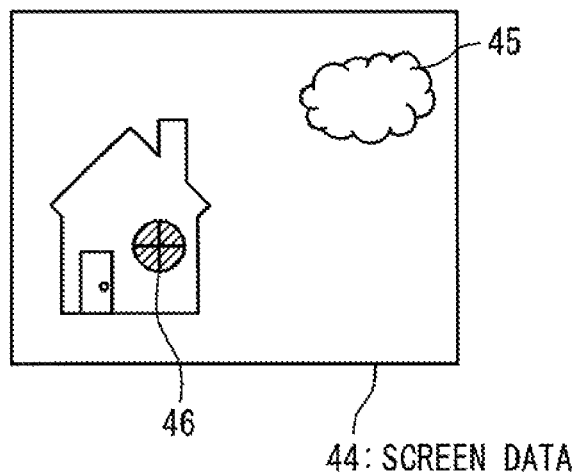
Figure 2C:
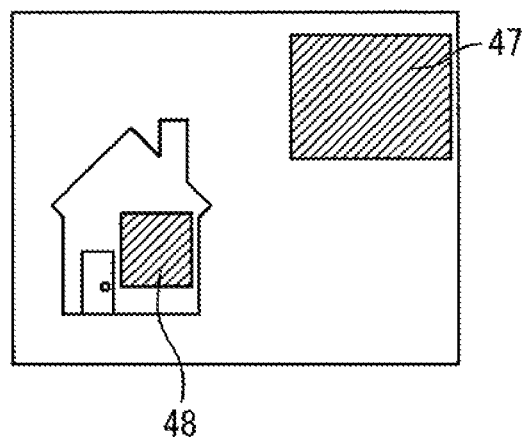

When the shape of a differential region is a rectangle, the two screen data, i.e. the current screen data (FIG. 2A) and the previous screen data (FIG. 2B), are compared, and a rectangular region on the current screen that includes a mass of pixels with pixel values having changed from those of the pixels of the previous screen, i.e. the rectangular region that includes different image data, is a differential region (FIG. 2C), as shown in FIGS. 2A to 2C.

Comparing the two screen data, which are the screen data 41 shown in FIG. 2A and the screen data 44 shown in FIG. 2B, an image 42 showing the sun in the screen data 41 and an image 45 showing a cloud in the screen data 44 are different. In addition, an image 43 showing a window of a house in the screen data 41 and an image 46 showing a window of a house in the screen data 44 are different. Therefore, a differential region 47 (a rectangular region that includes the image 42 and the image 45) and a differential region 48 (a rectangular region that includes the image 43 and the image 46) are differential regions of the screen data 44 to the screen data 41.

The priority determining section 123 receives pixel data of a differential region indicated by each differential region data given by the differential region extracting section 122, from the screen data storage section 121. The priority determining section 123 calculates a change data density of each differential region based on the pixel data. The change data density is calculated from, for example, change data density=(a total of change amounts)/(a square of an area of a differential region).

Figure 3:
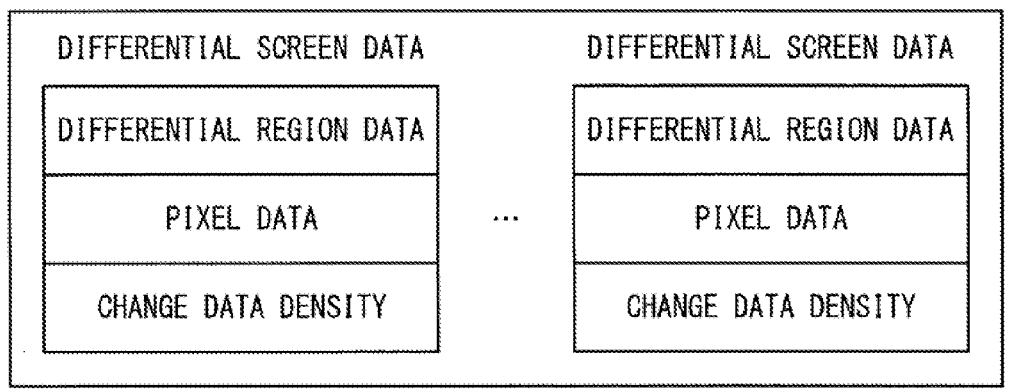
FIG. 3 shows an example of a differential screen data list.

The priority determining section 123 determines a priority based on the change data density, After that, the priority determining section 123 produces a list of differential screen data in the form of a set of calculated change data density, differential region data, and pixel data, for each differential region, as shown in FIG. 3. The differential screen data list is outputted to the encoding section 125.

The change data density is a value indicating a degree of change of a pixel value in a differential region, i.e. magnitude of change in image data in the differential region. The change data density takes a value that becomes smaller as the area of a differential region is larger and that becomes larger as a total of change amounts of pixel values of pixels in a differential region from the previous screen are larger. In the exemplary embodiment, the change data density itself is used as priority in transmitting pixel data (image data) of the differential region.

Figure 4:
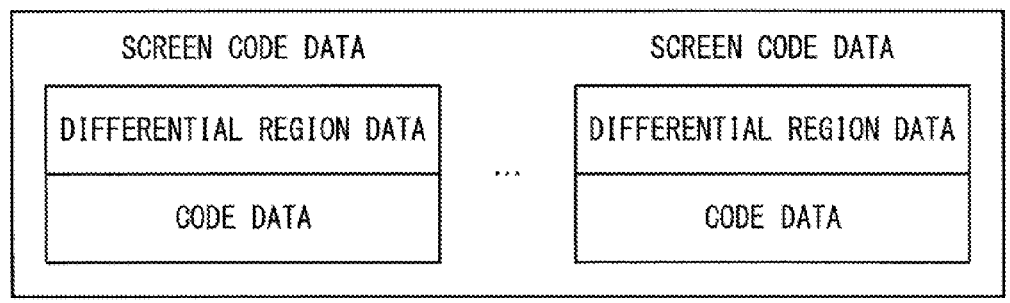
FIG. 4 shows an example of a screen code data list.

When a differential screen data list is given by the priority determining section 123, the encoding section 125 generates a screen code data list. The screen code data list includes a screen code data having a differential region data and a code data, as shown in FIG. 4. Each screen code data included in the screen code data list has one-to-one correspondence to a differential screen data in the differential screen data list. The code data is obtained by encoding pixel data in a corresponding differential screen data by use of image encoding methods such as JPEG. The differential region data is the same as differential region data in the corresponding differential screen data.

After generating a screen code data list, the encoding section 125 gives each screen code data included in the screen code data list to the server communication section 14 in order based on the priorities. That is to say, the encoding section 125 writes the screen code data into a transmission buffer 141 of the server communication section 14 in descending order of the change data density of the differential screen data. The write process is ended after all the screen code data of the screen code data list is written into the transmission buffer 141. Alternatively, the write process is ended when a write inhibit notice is received from the server communication section 14. After ending the write process, the encoding section 125 transfers the differential region data written into the transmission buffer 141, to the transmission screen data updating section 13. That is to say, the differential region data showing a differential region of which screen code data are transmitted (have been transmitted in a case) to the screen data reception client 3, is transferred to the transmission screen data updating section 13.

The server communication section 14 has a transmission buffer 141 for temporarily storing the screen code data that is transmitted to the screen data reception client 3. The server communication section 14 transmits the screen code data written into the transmission buffer 141 to the screen data reception client 3 in the order of the write of the screen code data. When the transmission buffer 141 does not have any free space left, the server communication section 14 issues a write disable notice to the encoding section 125. The server communication section 14 and the encoding section 125 form communication means for transmitting the screen code data of a differential region based on the priorities calculated by the priority determining section 123. That is to say, the server communication section 14 and the encoding section 125 are the communication means for primarily transmitting the screen code data of differential regions of high change data densities.

After receiving the differential region data indicating the differential region and transmitted from the encoding section 125, the transmission screen data updating section 13 receives pixel data of the differential region transmitted from the screen data storage section 121 based on the differential region data. Furthermore, the transmission screen data updating section 13 replaces pixel data stored in the transmission screen data storage section 124 identified by the differential region data, with pixel data of the differential region received from the screen data storage section 121. Additionally, after ending the above-mentioned replacement processing, the transmission screen data updating section 13 writes write control data indicating a write enable state to the screen data storage section 121. That is to say, the transmission screen data updating section 13 sets the screen data storage section 121 to the write disable state when receiving differential region data from the encoding section 125 and to the write enable state when the replacement processing is ended.

Next, a configuration of the screen data reception client 3 is described. The screen data reception client 3 includes a client communication unit 33 like the Ethernet for communicating with the screen data transmission server 1, a screen data outputting section 31, which is an image data displaying unit like a display, and a screen data generating section 32.

The screen data generating section 32 generates screen data outputted to the screen data outputting section 31, based on screen code data transmitted from the screen data transmission server 1. The screen data generating section 32 having such a function, includes a decoding section 323, a differential region updating section 322, and a screen data storage section 321.

The decoding section 323 decodes a code data of a screen code data (see FIG. 4) transmitted from the screen data transmission server 1, by the use of image encoding methods such as the JPEG. A reception-side differential screen data having the differential region data of the screen code data and pixel data generated as a result of decoding, is transferred to the differential region updating section 322.

The differential region updating section 322 specifies a region of pixel data stored in the screen data storage section 321, based on the differential region data in reception-side differential screen data transferred from the decoding section 323. The differential region updating section 322 replaces the pixel data of the specified region, with pixel data included in the reception-side differential screen data.

The screen data storage section 321 stores the screen data that is outputted to the screen data outputting section 31.

Figure 5:
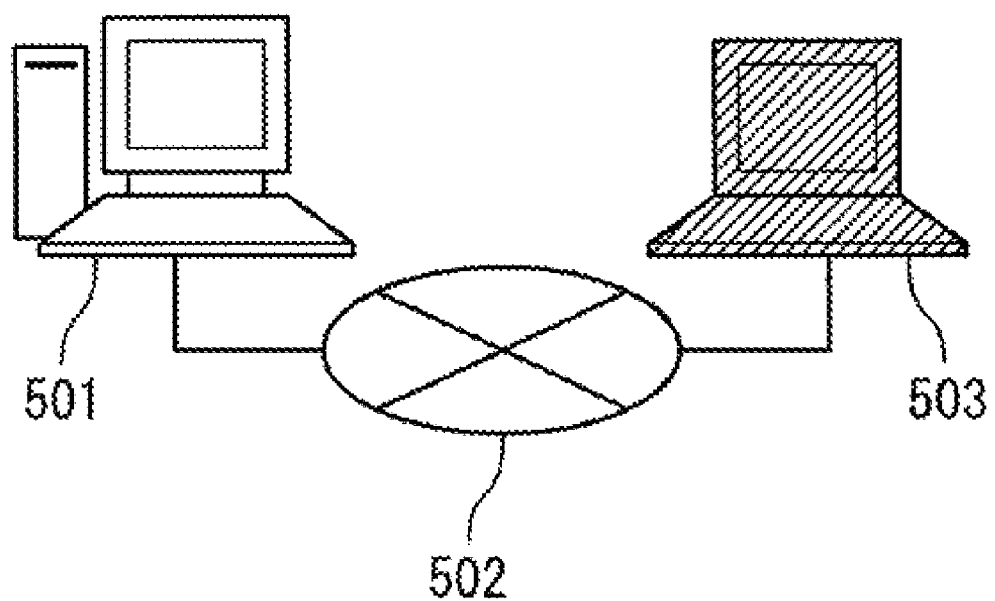
FIG. 5 is a block diagram showing a hardware configuration example of a screen data transmitting system according to the first exemplary embodiment.

FIG. 5 is a block diagram showing a hardware configuration example of the screen data transmitting system according to the present exemplary embodiment. The screen data transmitting system has a personal computer 501 for realizing the screen data transmission server 1, a personal computer 503 for realizing the screen data reception client 3. The both are connected with each other through the Internet 502.

The personal computer 501 for realizing the screen data transmission server 1 has a central processing unit and a memory. In the memory, such programs as an operating system and an application program for making the central processing unit function as the screen data generating section 10, the screen data acquiring section 11, the screen data transmitting section 12, and the transmission screen data updating section 13 are recorded. In addition, the personal computer 501 has the Ethernet functioning as the server communication section 14, and a RAM (Random Access Memory) functioning as the screen data storage section 121 and the transmission screen data storage section 124.

On the other hand, the personal computer 503 functioning as the screen data reception client 3 has a central processing unit and a memory. In the memory, such programs as an operating system and an application program for making the central processing unit function as the differential region updating section 322 and the decoding section 323. Furthermore, the personal computer 503 has a display unit functioning as the screen data outputting section 31, the Ethernet functioning as the client communication unit 33, and a graphic board with a VRAM (Video Random Access Memory) functioning as the screen data storage section 321.

Next, an operation of the exemplary embodiment will be described in detail.

Figure 6:
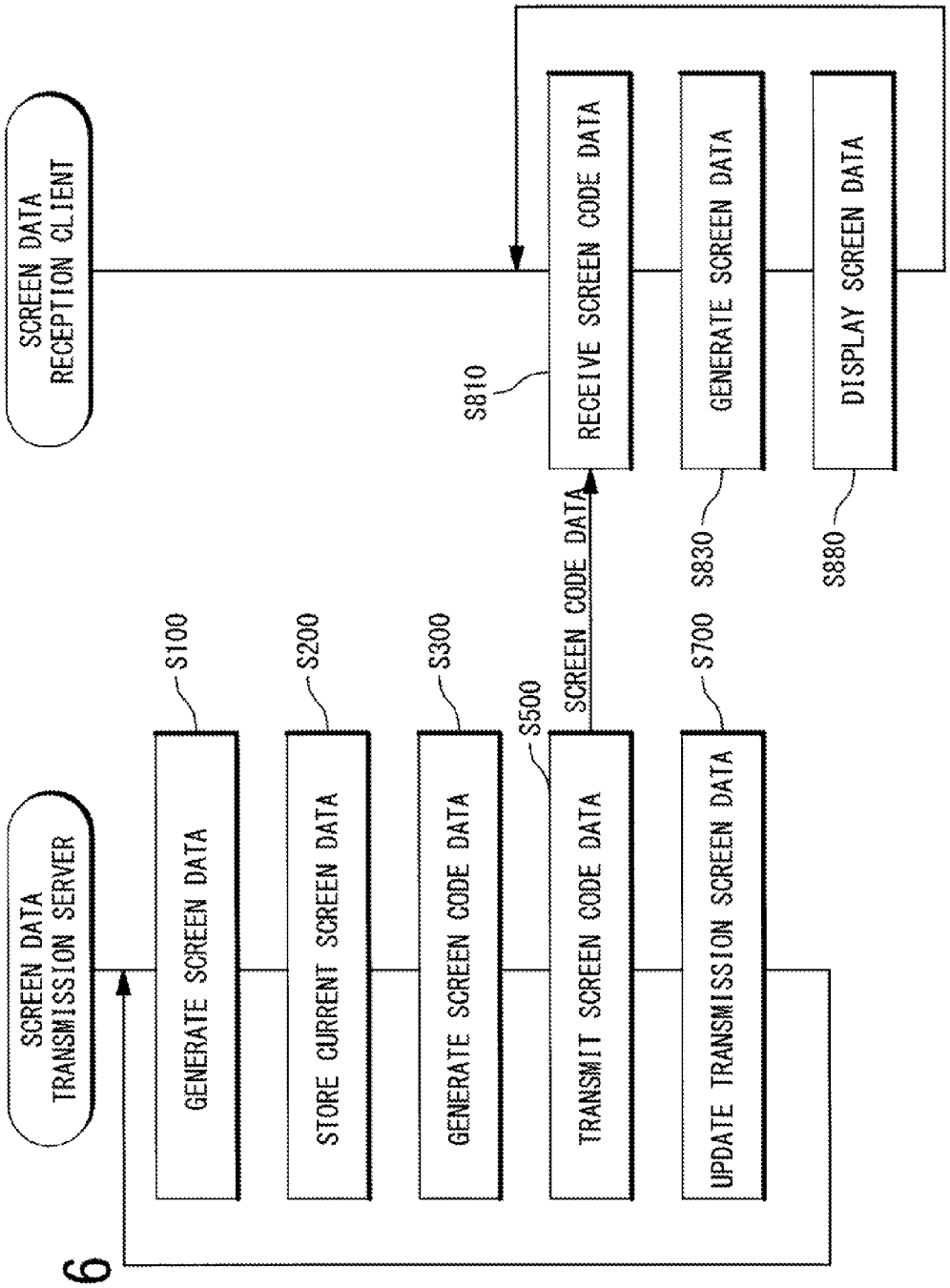
FIG. 6 is a flow chart showing an operation of the screen data transmitting system according to the first exemplary embodiment.

First, an operation overview of the screen data transmitting system according to the exemplary embodiment will be described with reference to a flow chart shown in FIG. 6.

The screen data generating section 10 generates screen data and then transfers the screen data to the screen data acquiring section 11 (step S100).

The screen data acquiring section 11 acquires the screen data, and writes the screen data into the screen data storage section 121 of the screen data transmitting section 12 (step S200). At this time, the screen data acquiring section 11 determines whether or not the write operation is enabled, based on a write control data stored in the screen data storage section 121, and writes the screen data into the screen data storage section 121 when the write operation is enabled. When the write operation is not enabled, the screen data acquiring section 11 waits until the write operation is enabled and writes the screen data into the screen data storage section 121. That is to say, the screen data of the current screen is stored in the screen data storage section 121.

The screen data transmitting section 12 extracts a differential region based on the screen data of the current screen written into the screen data storage section 121 and the screen data of a previous screen stored in the transmission screen data storage section 124, generates a differential screen data list (see FIG. 3), and generates a screen code data list (a set of screen code data: see FIG. 4). The screen data transmitting section 12 assigns a priority to the screen code data in the screen code data list based on a change data density and transfers the screen code data to the server communication section 14 in descending order of priority (step S300). Details of the step S300 are mentioned later.

The server communication section 14 writes the screen code data received from the screen data transmitting section 12 into the transmission buffer 141 in order, and transmits the screen code data in order of the write to the screen data reception client 3 through the network 2. Additionally, the server communication section 14 issues a write disable notice to the screen data transmitting section 12 when no free space is left in the transmission buffer 141 (step S500).

When ending transmission of all the generated screen code data to the server communication section 14 or when receiving the write disable notice from the server communication section 14, the screen data transmitting section 12 transfers the transmitted differential region data to the transmission screen data updating section 13. The transmission screen data updating section 13 updates the transmission screen data based on the differential region data indicating a transmitted differential region and transferred from the screen data transmitting section 12 (step S700). A detailed updating operation for transmission screen data will be mentioned later.

The screen code data transmitted from the server communication section 14 at the step S500 is transmitted to the screen data reception client 3 through the network 2. The client communication section 33 in the screen data reception client 3 transfers the received screen code data to the screen data generating section 32 (step S810).

The screen data generating section 32 executes a decoding process based on the acquired screen code data to generate a screen data and transferred the screen data to the screen data outputting section 31 (step S830). A detailed operation of the screen data generating section 32 will be mentioned later.

The screen data outputting section 31 displays the screen data generated by the screen data generating section 32 (step S880).

Next, an operation at the time of storing the screen data generated by the screen data generating section 10 into the screen data storage section 121 will be described in detail with reference to FIG. 7. When acquiring screen data (step S120), the screen data acquiring section 11 reads the write control data from the screen data storage section 121 and checks whether or not the write is enabled. When the write control data indicates the write disable state (step S211), the screen data acquiring section 11 waits until the write becomes possible. When the write control data indicates the write enable state (step S212), the acquired screen data is written into the screen data storage section 121 (step S230). After ending write of the screen data, a write completion is notified to the screen data transmitting section 12 (differential region extracting section 122) (step S240). The screen data transmitting section 12 (differential region extracting section 122) writes the write control data into the screen data storage section 121 to indicate the write disable state (step S250) and sets the screen data storage section 121 to the write disable state (step S290).

Figure 8:
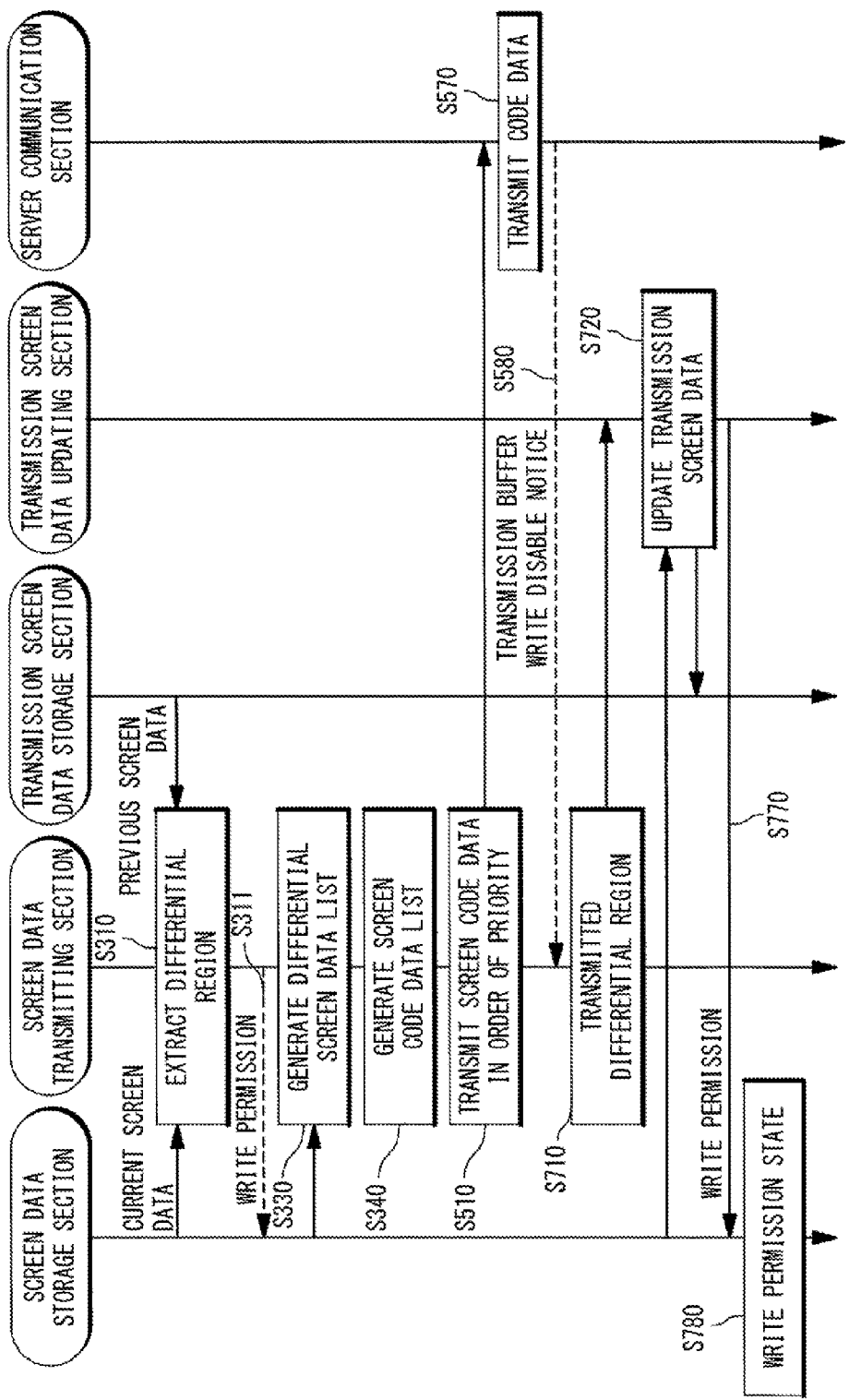
FIG. 8 is a sequence diagram showing an operation of the screen data transmitting section.

Next, an operation of the screen data transmitting section 12 will be described in detail with reference to FIG. 8. After the screen data is written into the screen data storage section 121, the differential region extracting section 122 compares the screen data for the current screen stored in the screen data storage section 121 and the screen data for the previous screen stored in the transmission screen data storage section 124, and executes an extracting process for differential regions. When a differential region is extracted, a differential region data for the extracted differential region is generated (step S310). When there is no difference between the current screen and the precious screen, the differential region extracting section 122 writes the write control data into the screen data storage section 121 to indicate the write enable state and waits for the next write of screen data (step S331).

When the differential region data is generated, the priority determining section 123 acquires pixel data of the differential region specified by each differential region data from the screen data storage section 121 and calculates a change data density of the differential region based on the acquired pixel data. After that, the priority determining section 123 generates a differential screen data list (see FIG. 3), which is a list of differential screen data including differential region data, pixel data, and the change data density for each differential region, and transfers the differential screen data list to the encoding section 125 (step S330).

The encoding section 125 receives the differential screen data list, and encodes the pixel data of the differential screen data. That is to say, the encoding section 125 firstly pays attention on one differential screen data in the differential screen data list and encodes pixel data of the concerned differential screen data by using image encoding methods such as JPEG. Next, the encoding section 125 generates the screen code data that includes code data generated as a result of encoding process and the differential region data in the concerned differential screen data, and adds the generated screen code data to the screen code data list. By repeating the above process until all the differential screen data are processed, a screen code data list is generated as shown in FIG. 4 (step S340).

After that, the encoding section 125 sends the screen code data included in the screen code data list to the server communication section 14 in descending order of the change data density and writes the screen code data into the transmission buffer 141 (step S510). This write operation is performed until the write operation of all the screen code data in the screen code data list is completed or until the write disable notice is issued from the server communication section 14.

The server communication section 14 transmits the screen code data written into the transmission buffer 141 to the screen data reception client 3 in order of the write (step S570). When no free space is left in the transmission buffer 141, the server communication section 14 issues the write disable notice to the encoding section 125 (step S580).

In a narrowband environment, it is highly possible that the write disable notice is issued from the server communication section 14 during the write of screen code data of a screen code data list into the transmission buffer 141. In this case, only part of the screen code data of the screen code data list can be transmitted to the screen data reception client 3. For this reason, in the exemplary embodiment, the screen code data corresponding to a differential region having a high change data density is written into the transmission buffer 141 in priority and transmitted to the screen data reception client 3 in order of the write. In general, a portion that needs to be recognized by a user on a screen on which an icon operated by a user is displayed is prepared to have a great degree of color change. As mentioned above, therefore, a data to be recognized by the user is transmitted to the screen data reception client 3 reliably without delay even in the narrowband environment by primarily transmitting the screen code data corresponding to differential region with a high change data density indicating a degree of change in a pixel.

After ending the write of all the screen code data of the screen code data list into the transmission buffer 141 or after receiving the write disable notice, the encoding section 125 transfers the transmitted differential region data to the transmission screen data updating section 13 (step S710).

After receiving the transmitted differential region data, the transmission screen data updating section 13 receives the pixel data of the transmitted differential region from the screen data storage section 121 based on the differential region data. The transmission screen data updating section 13 then replaces the pixel data specified by the differential region data of transmission screen data stored in the transmission screen data storage section 124 with the received pixel data (step S720). After that, the transmission screen data updating section 13 writes the write control data into the screen data storage section 121 to indicate the write enable state (step S770).

Figure 9:
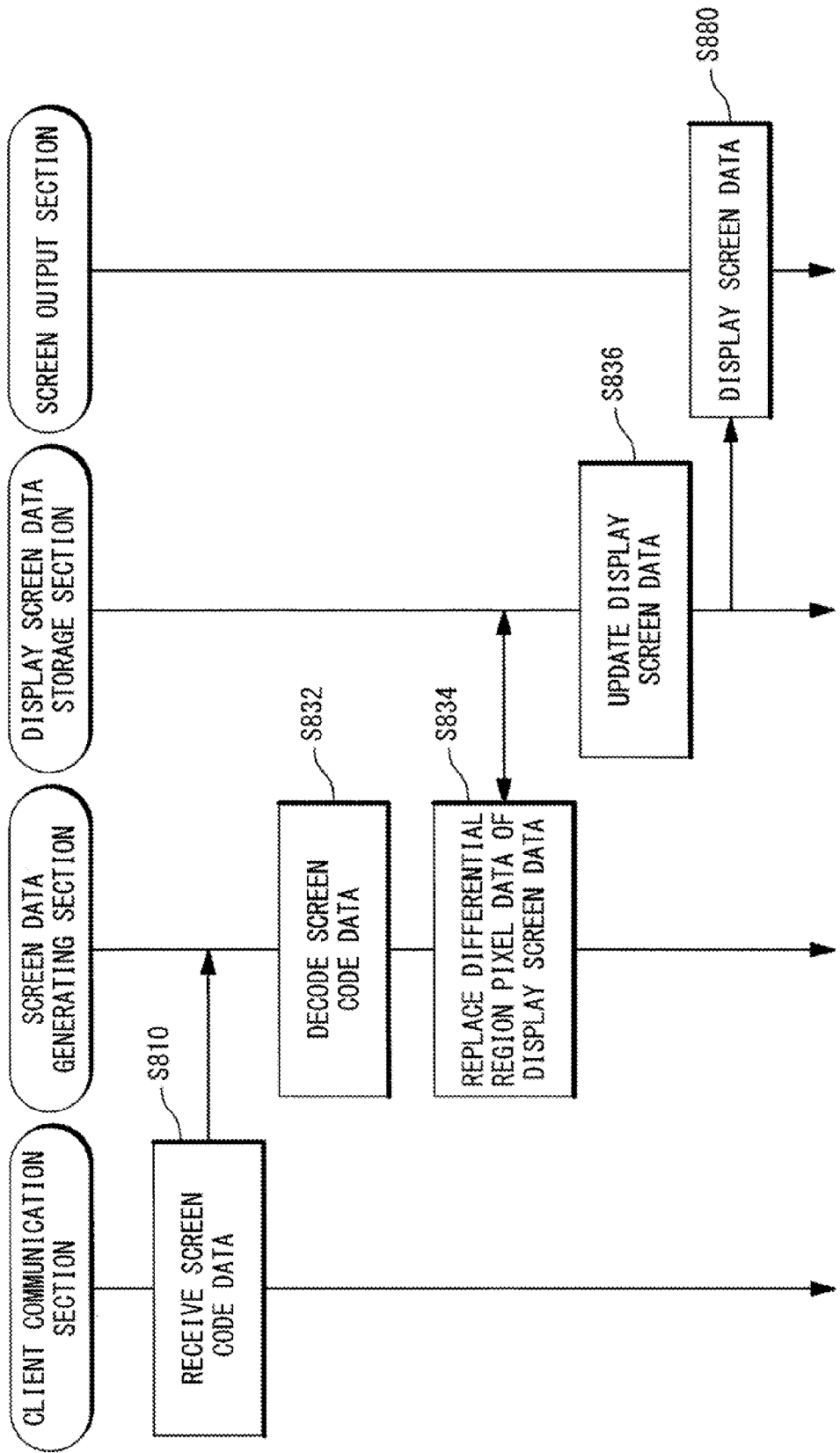
FIG. 9 is a sequence diagram showing an operation of a screen data reception client.

Next, a screen data generating process by the screen data reception client 3 will be described in detail with reference to FIG. 9. The client communication section 33 receives the screen code data transmitted from the screen data transmission server 1 and transfers the screen code data to the screen data generating section 32 (step S810). The decoding section 323 in the screen data generating section 32 decodes the code data of the screen code data by using an image encoding method such as the JPEG. The pixel data obtained as a result of the decoding and the differential region data of the screen code data are transferred to the differential region updating section 322 as the reception-side differential screen data (step S832).

The differential region updating section 322 updates the pixel data of a differential region based on the reception-side differential screen data received from the decoding section 323. That is to say, the differential region updating section 322 replaces the pixel data of a region specified by the differential region data among pixel data stored in the screen data storage section 321, with the pixel data obtained as a result of the decoding (steps S834 and S836).

After the screen data is updated, the screen data outputting section 31 displays the screen data recorded in the screen data storage section 321 (step S880). The above process is executed each time the screen code data is transmitted from the screen data transmission server 1.

As mentioned, the screen data generated by the screen data transmission server 1 is transmitted to the screen data reception client 3 and the screen data is updated. In the present invention, priorities are assigned to differential regions in accordance with predetermined criteria and transmission is performed in descending order of priority. Accordingly, the differential regions that are not transmitted and received due to restrictions of communication bands are limited to differential regions with low priorities. Therefore, influence on screen update on the side of the screen data reception client 3 can be reduced to a minimum.

In Addition, in the exemplary embodiment, the priority determining section 123 performs the following calculation: (change data density)=(a total of change amounts)/(a square of an area of a differential region), for each differential region and obtains the change data density indicating a degree of change of pixel values of each differential region. The screen code data are transmitted in descending order of the change data density in the differential region. Therefore, it is possible to primarily transmit the screen code data of a differential region with a small area but with a great degree of change in pixel value. For example, a case is assumed that two kinds of differential regions are present in one screen. Supposing that one is a differential region (like a change portion in a background of a video image) with a large area but with a small degree of change in pixel value, and the other is a differential region (like an icon on a desktop which a user has operated) with a small area but with a large degree of change in pixel value. In this case, the screen code data of a differential region corresponding to an icon which a user expects to change is primarily transmitted. Therefore, display states of icons can be changed promptly and hence users do not feel discomfort.

Next, a specific example of the exemplary embodiment will be described.

First, an operation when the screen data transmission server 1 transmits the first screen data to the screen data reception client 3 will be described. The screen data transmission server 1 and the screen data reception client 3 transmit and receive the screen code data by using the HTTP Keep-Alive mode.

The screen data transmission server 1 receives an HTTP connection request from the screen data reception client 3, and clears a previous screen data. That is to say, a pixel value of every pixel data stored in the transmission screen data storage section 124 is set to 0. Therefore, in the screen data first generated by the screen data generating section 10 (also to be referred to as initial screen data) after receiving HTTP connection request, the screen data transmission server 1 extracts the entire screen as a differential region.

That is to say, the differential region extracting section 122 extracts the entire screen as a differential region since a pixel value of every pixel data included in the screen data stored in the transmission screen data storage section 124 is 0. As a result, the code data obtained by encoding the whole initial screen data stored in the screen data storage section 121, is transmitted to the screen data reception client 3. Therefore, the initial screen data is stored in the transmission screen data storage section 124 by the transmission screen data updating section 13. It should be noted that when a write disable notice is issued from the server communication section 14 while writing the screen code data corresponding to the initial screen data into the transmission buffer 141, the encoding section 125 executes a write process of the screen code data again after a predetermined time has passed (a time in which sufficient free space is secured in the transmission buffer 141). The encoding section 125 repeats the above-mentioned process until the write of the screen code data succeeds, and transfers the transmitted differential region data to the transmission screen data updating section 13 when the write has succeeded.

Next, operations of the differential region extracting section 122 and the priority determining section 123 will be described with reference to FIG. 10 to FIG. 13. Here, description will be made, assuming that the screen data includes pixel data of each pixel in a screen and each pixel data has a coordinate value indicating a position of a pixel and a pixel value indicating intensity of each color component. More in detail, R, G, and B components are each expressed by 8 bits, and 24-bit configuration data is used in which the R component, the B component, and the G component are respectively placed to the most significant bit portion, the least significant bit portion, and the middle portion. When R=8; G=50; and B=170, for example, a pixel value is 8*65536+50*256+170=537258.

The differential region extracting section 122 in a specific example generates differential region data as follows. That is, the screen data of the current screen is stored in the screen data storage section 121 and the screen data of the previous screen is stored in the transmission screen data storage section 124. First, the differential region extracting section 122 compares the screen data of the current screen and the screen data of the previous screen, and extracts pixel data with a change amount (difference amount) of a pixel value more than a predetermined constant value (smallest difference amount) from the screen data of the current screen. After that, the differential region extracting section 122 regards as a differential region, a rectangular region covering a set of extracted pixel data connected through line segments mutually connecting extracted pixel data with a distance equal to or smaller than a predetermined constant value (smallest interpixel distance). The differential region extracting section 122 then generates the differential region data that includes coordinate values of the upper-left and lower-right vertices of a rectangular region.

Figure 10:
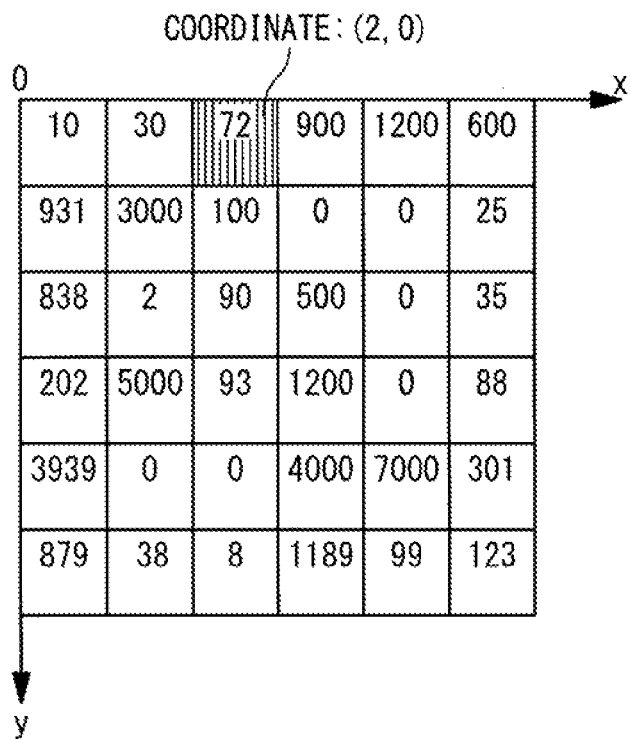
FIG. 10 shows an example of a screen data of a previous screen stored in a transmission screen data storage section.
Figure 11:
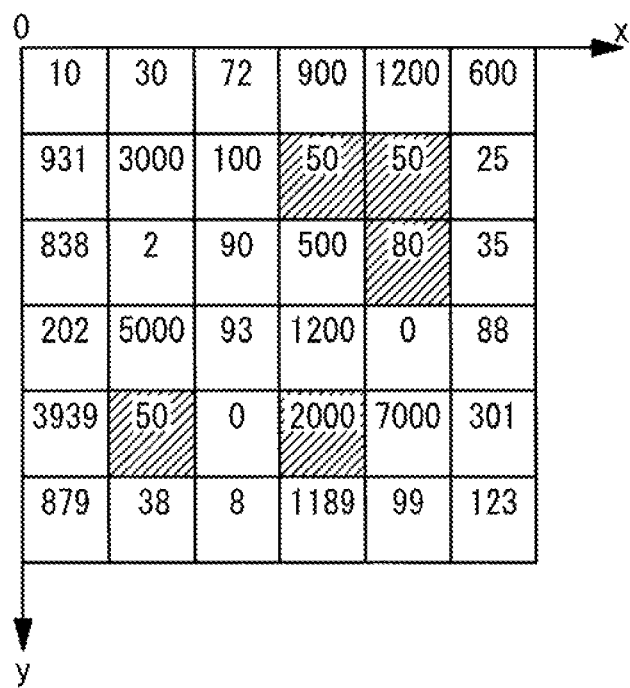
FIG. 11 shows an example of a screen data of a current screen stored in a screen data storage section.

The screen data of the previous screen is stored in the transmission screen data storage section 124 as shown in FIG. 10 and the screen data of the current screen is stored in the screen data storage section 121 as shown in FIG. 11. It should be noted that the smallest difference amount is set to 50 and the smallest interpixel distance is set to 1.

As shown in FIG. 10 and FIG. 11, the screen data is configured from 36 pixel data in 6 by 6. In the coordinate system of the screen data, the upper-left pixel data is the origin, the horizontal axis is the x axis (x increases rightward), and the vertical axis is the y axis (y increases downward). A numerical value written in each square indicates a pixel value. For example, in FIG. 10, the pixel data shown with vertical stripes has a coordinate value of (2, 0) and a pixel value of 72.

The differential region extracting section 122 compares the screen data of the previous screen and the screen data of the current screen, and extracts the pixel data equal to or more than the difference amount of 50 as the smallest difference amount on the current screen. In this process, the pixels shown with diagonal lines in FIG. 11 are extracted as extraction pixel.

Figure 12:
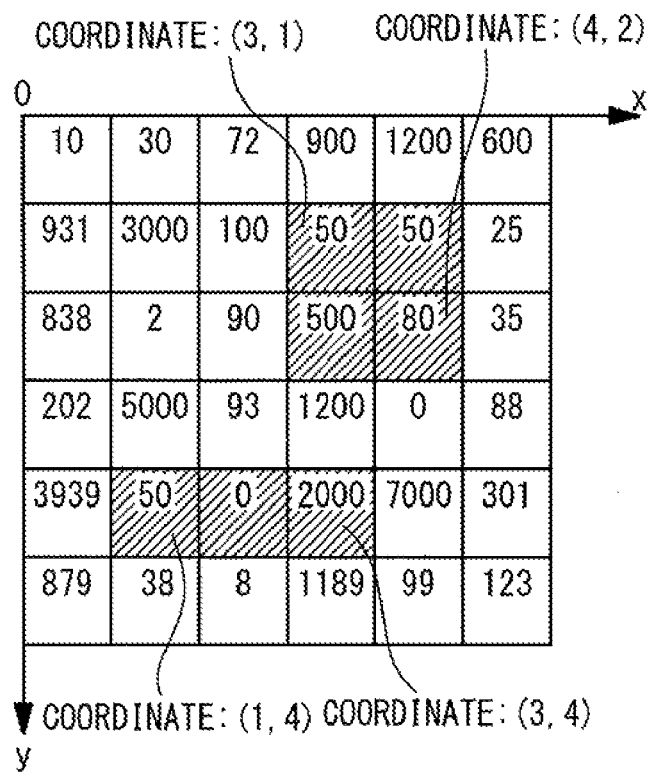
FIG. 12 is a diagram showing differential regions when the screen data of a previous screen and the current screen are as shown in FIG. 10 and FIG. 11.
Figure 13:
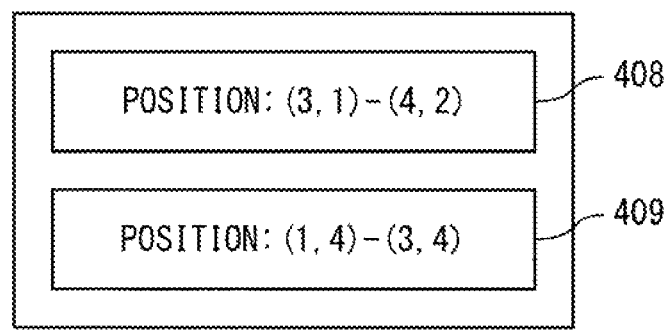
FIG. 13 shows an example of a differential region data.

Next, the differential region extracting section 122 regards the smallest rectangular region covering a set of extraction pixels which are connected by line segments of the distance equal to or smaller than 1 as the smallest interpixel distance, as a differential region (a portion shown by diagonal lines in FIG. 12). The differential region extracting section 122 generates two differential region data 408 and 409 as differential region data of rectangular regions (differential regions) as shown in FIG. 13. The differential region data 408 indicates that coordinate values of the upper-left and lower-right vertices of a differential region are (3, 1) and (4, 2), respectively, while the differential region data 409 indicates that the upper-left and lower-right coordinate values of a differential region are (1, 4) and (3, 4), respectively.

Next, an operation of the priority determining section 123 will be described with reference to FIG. 14A to FIG. 14C.

Figure 14A:
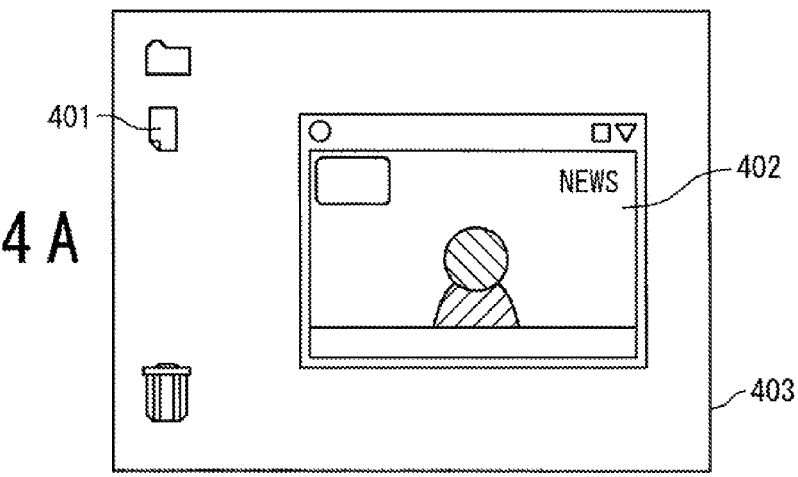
FIGS. 14A to 14C are diagrams showing an operation of a priority determining section.

As shown in FIG. 14A, screen data 403 is stored in the transmission screen data storage section 124 and the screen data storage section 321. The screen data 403 has a video image replaying region 402 for replaying a video image.

A user uses the screen data reception client 3 to select an icon 401 by a mouse operation to indicate a file on a screen on which the screen data 403 shown in FIG. 14A is displayed. Additionally, a screen image displayed on the video image replaying region 402 changes. As a result, a screen data 404 is generated as shown in FIG. 14B and the screen data 404 is stored in the screen data storage section 121 by the screen data acquiring section 11. In this example, a color of the whole icon 401 gets deeper and the character string "NEWS" changes to "WEATHER" at the upper right of the video image replaying region 402.

Figure 14B:
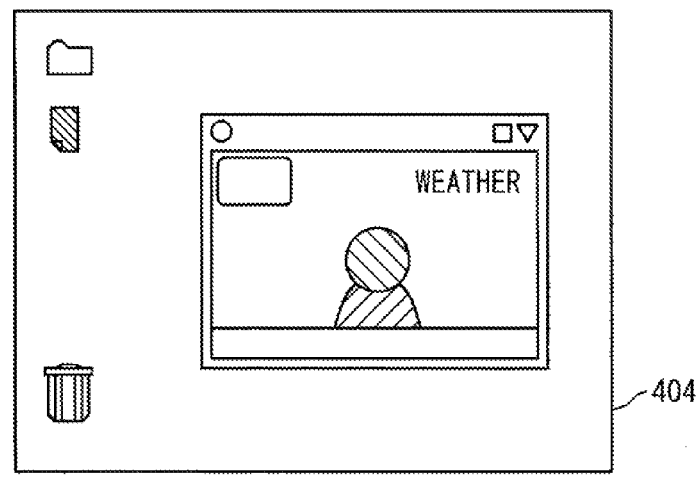

After the screen data 404 is written into the screen data storage section 121, the differential region extracting section 122 acquires the screen data 403 and 404 shown in FIG. 14A and FIG. 14B from the transmission screen data storage section 124 and the screen data storage section 121. The differential region extracting section 122 generates differential region data which specifies differential regions 405 and 406 as shown in FIG. 14C.

The priority determining section 123 calculates change data density of the differential regions 405 and 406 specified by the differential region data. The priority determining section 123 calculates the change data density as follows:

(Change data density)=(a total of change amounts)/(a square of an area of a differential region)  (1)

The change data density becomes smaller as an area of a differential region is larger and becomes larger as the total of change amounts of pixel values (the total of change amounts) of pixels in a differential region is larger.

Figure 14C:
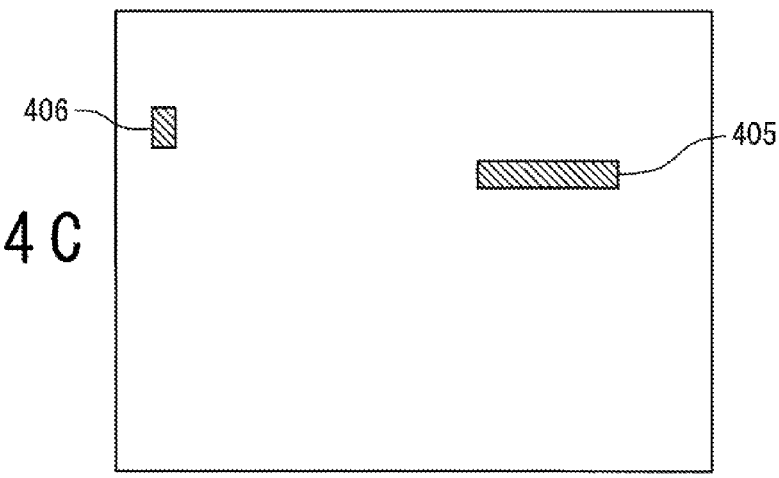

As shown in FIG. 14C, the pixel values of pixel data forming the character string have changed in the differential region 405 while pixel values of pixel data in the region have changed in the differential region 406. Additionally, the area of the differential region 406 is smaller than that of the differential region 405. For this reason, the differential region 406 has a higher change data density. Therefore, a priority assigned to the differential region 406 is higher than a priority assigned to the differential region 405.

The encoding section 125 primarily writes the screen code data of the differential region 406 corresponding to the icon 401 having operated by a user, into the transmission buffer 141, compared with the screen code data of the differential region 405 corresponding to the character string in a video image. Therefore, the transmission of screen code data of the differential region 406 relevant to user operation is not delayed due to the transmission of screen code data of the differential region 405 in a video image, even in the narrowband environment.

Next, an operation of the transmission screen data updating section 13 will be described with reference to FIGS. 15A to 15D. After the screen code data of the differential region 406 is transmitted, the encoding section 125 transfers the differential region data showing the transmitted differential region to the transmission screen data updating section 13. That is to say, the differential region data showing the transmitted differential region 406 is transferred from the encoding section 125 to the transmission screen data updating section 13 as shown in FIG. 15A.

The transmission screen data updating section 13 receives the differential region data showing the differential region 406, and then acquires pixel data indicating the icon 401 in the region indicated by the differential region data, from the image data 404 of the current screen stored in the screen data storage section 121, as shown in FIG. 15B. After that, the transmission screen data updating section 13 replaces the pixel data of the region indicated by the differential region data on the screen data 403 stored in the transmission screen data storage section 124, with the pixel data 401 acquired from the screen data storage section 121, as shown in FIG. 15C. As a result, the screen data in the transmission screen data storage section 124 changes from the screen data 403 to screen data 407, as shown in FIG. 15D.

Figure 16:
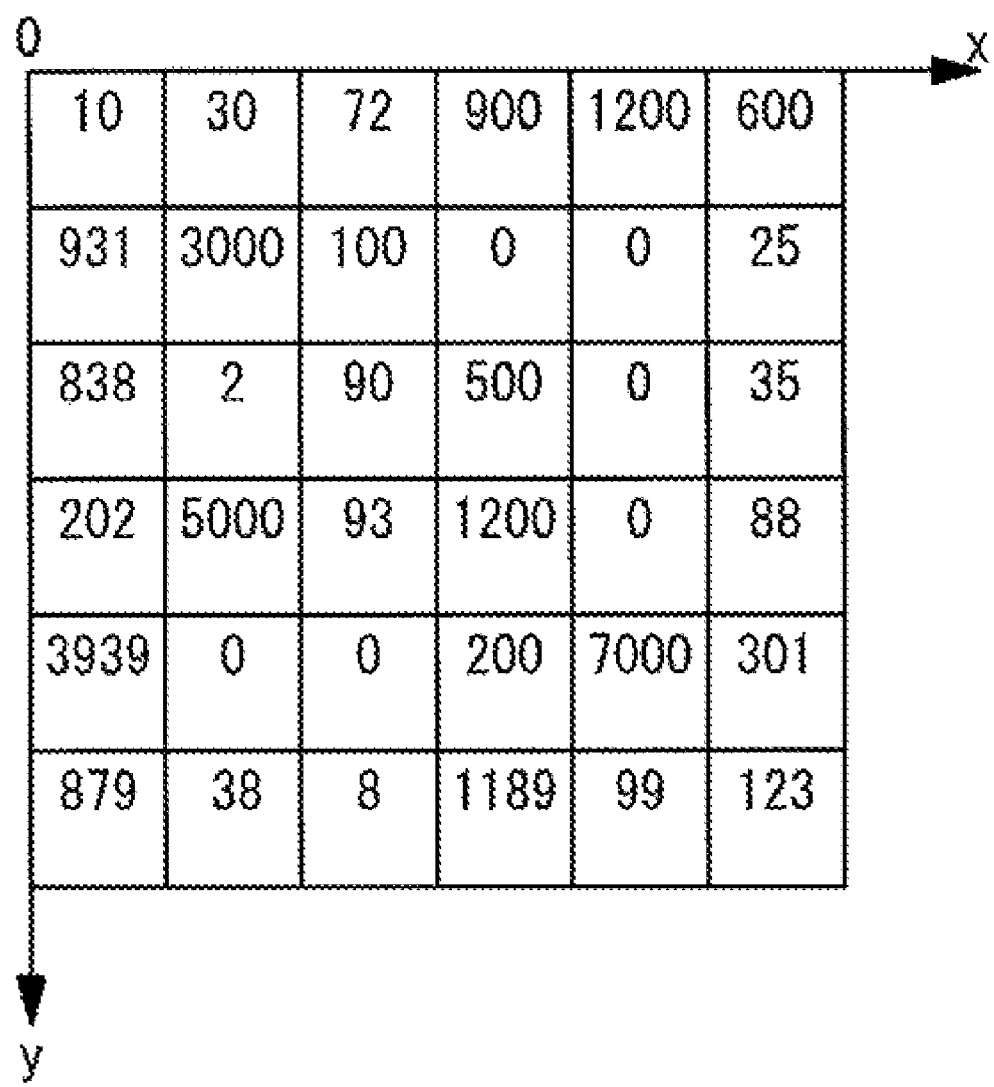
FIG. 16 is a screen data for showing the operation of a differential region updating section.
Figure 17:
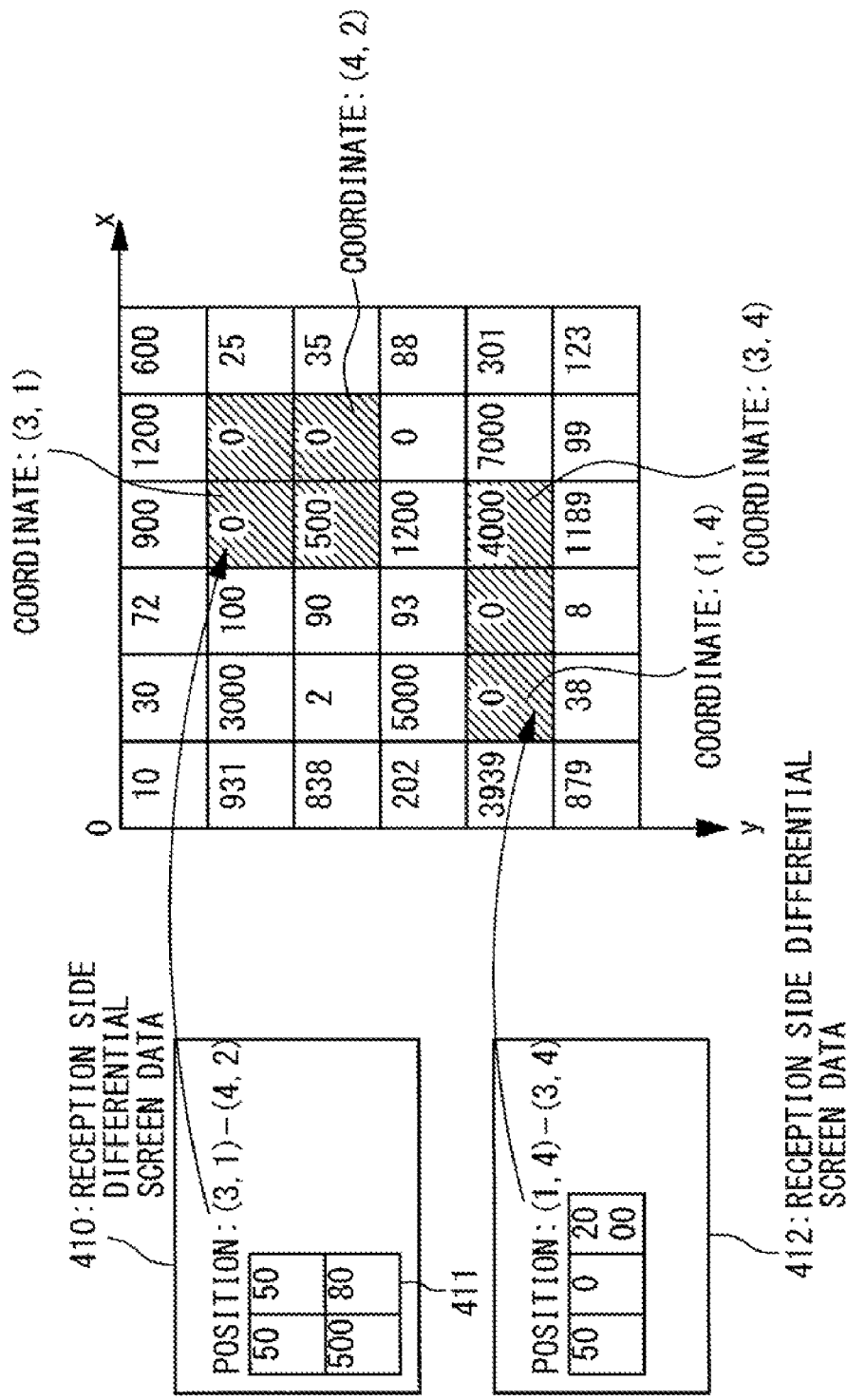
FIG. 17 is a diagram showing an operation of the differential region updating section.

Next, an operation of the screen data reception client 3 will be described with reference to FIG. 16 to FIG. 18. As shown in FIG. 16, screen data is in the screen data storage section 321. In this state, the decoding section 323 decodes the screen code data transmitted from the screen data transmission server 1, and generates reception-side differential screen data 410 and 412 as shown in FIG. 17. The decoding section 323 sends the reception-side differential screen data 410 and 412 to the differential region updating section 322.

The differential region updating section 322 updates the screen data stored in the screen data storage section 321 by using the reception-side differential screen data 410 and 412 generated by the decoding section 323. That is to say, the differential region updating section 322 searches the screen data stored in the screen data storage section 321 for the pixel data in a region indicated by the coordinate values (3, 1) and (4, 2) in the reception-side differential screen data 410, and replaces the searched pixel data with the pixel data 411 in the reception-side differential screen data 410. The differential region updating section 322 executes the same process for the reception-side differential screen data 412.

Figure 18:
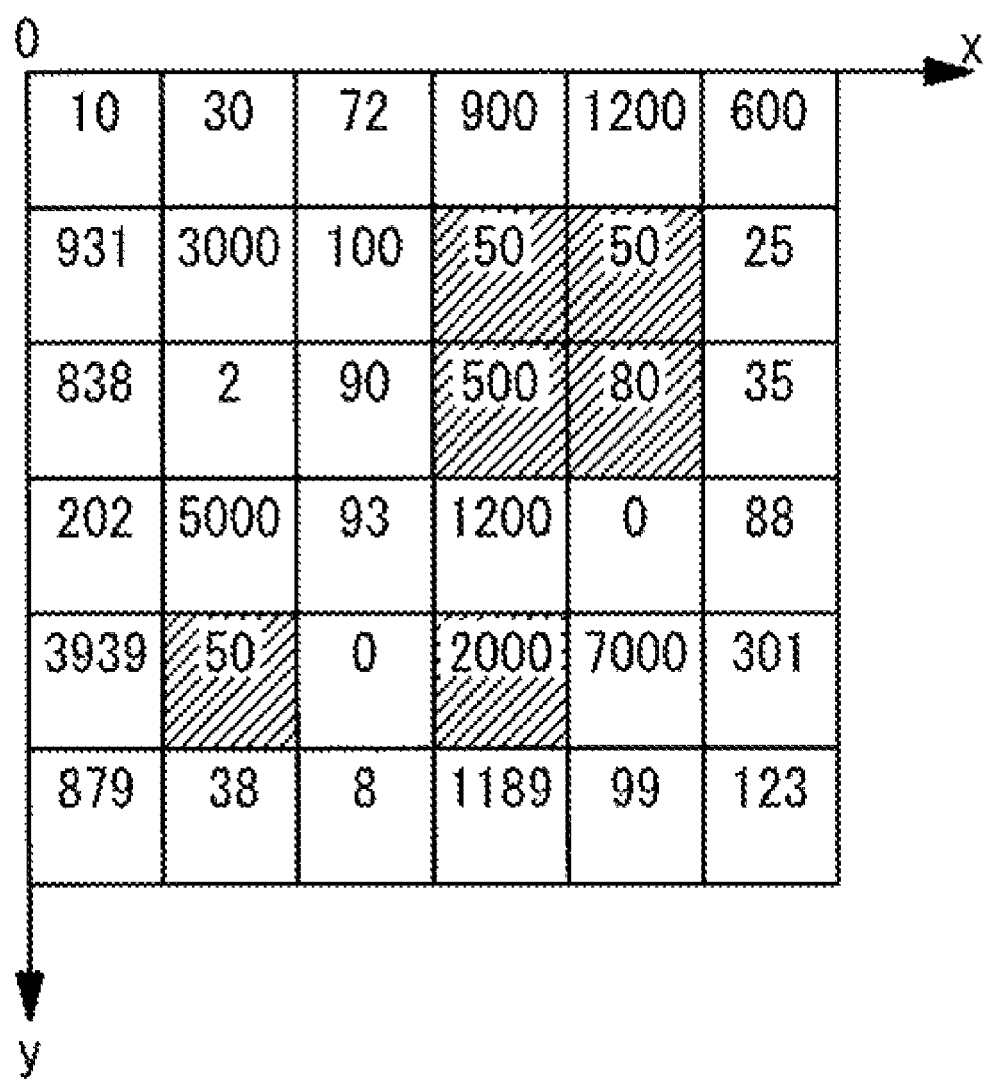
FIG. 18 is a diagram showing the operation of the differential region updating section.

Through this process, the screen data stored in the screen data storage section 321 is as shown in FIG. 18. The screen code data that has only partly been transmitted is discarded.

The above-mentioned process will be described as follows with reference to FIGS. 19A to 19C. As shown in FIG. 19B, the screen data is in the screen data storage section 321. At this time, it is assumed that the screen code data including the pixel data indicating the icon 401 and the differential region data of the differential region 406 corresponding to the icon 401 are transmitted from the screen data transmission server 1, as shown in FIG. 19A. The decoding section 323 decodes the screen code data, which is then transferred to the differential region updating section 322.

The differential region updating section 322 replaces the pixel data of the screen data 403 specified by the differential region data, with the pixel data of the icon 401, as shown in FIG. 19B. As a result, the screen data in the screen data storage section 321 is changed to screen data 414 as shown in FIG. 19C. The screen data 414 is displayed on a display unit by the screen data outputting section 31.

Second Exemplary Embodiment

Next, the second exemplary embodiment of the present invention will be described in detail. In the first exemplary embodiment, an example is described in which image data are transmitted in descending order of change data density. It is possible that image data of a differential region with a low change data density is scarcely transmitted to the screen data reception client 3, when screen change often occurs in a narrowband environment. For this reason, in the present exemplary embodiment, a priority is determined by taking account of past transmission histories. Here, the change data density weighted with a weight in accordance with transmission histories (weighted change data density) is used as a priority, to transmit image data of a differential region.

FIG. 20 is a block diagram showing a configuration example of the screen data transmitting system according to a second exemplary embodiment. A difference from the first exemplary embodiment shown in FIG. 1 is in that a screen data transmission server 5 is provided instead of the screen data transmission server 1.

The screen data transmission server 5 is different from the screen data transmission server 1 in that a screen data transmitting section 51 is provided instead of the screen data transmitting section 12 and in that a weight generating section 52 and a transmission history storage section 53 are added. The screen data transmitting section 51 is different from the screen data transmitting section 12 in that a priority determining section 54 and an encoding unit 55 are provided instead of the priority determining section 123 and the encoding section 125, respectively.

A transmission history of each of blocks at the time of dividing a screen into the blocks is stored in the transmission history storage section 53. As the transmission history, the latest transmission time and transmission frequency can be used, for example.

The priority determining section 54 calculates change data density for each differential region extracted by the differential region extracting section 122 in the same way as the first exemplary embodiment, and generates a weighted change data density of the differential region based on a weight acquired from the weight generating section 52. After that, the differential screen data, which is a set of the differential region data, the pixel data, and the weighted change data density is listed for each differential region, to generate a differential screen data list. The priority determining section 54 transfers the generated differential screen data list to the encoding unit 55. The differential screen data list is almost the same as the differential screen data list shown in FIG. 3, but includes the weighted change data density instead of the change data density.

The weight generating section 52 generates a weight used to weight a change data density of a differential region based on a transmission history of each block stored in the transmission history storage section 53. The weight generating section 52 transfers the generated weight to the priority determining section 54. The weight is set based on a time from the latest transmitting time to the present time, and a transmission history, for example. That is to say, a differential region that is frequently transmitted is calculated to have a light weight and a small weighted change data density while a differential region that is not transmitted so often is calculated to have a heavy weight and a large weighted change data density. Additionally, the weight generating section 52 updates the transmission histories stored in the transmission history storage section 53 based on the differential region data transferred from the encoding unit 55. When the weight is calculated based on a history of the latest transmission time, for example, the latest transmission time of each block covered by a differential region indicated by the differential region data is updated to a current time. When the weight is calculated based on a history of transmission frequency, the transmission frequency of a corresponding block is incremented.

After a differential screen data list is transferred from the priority determining section 54, the encoding unit 55 generates a screen code data list in the same way as the first exemplary embodiment, as shown in FIG. 4. The encoding unit 55 writes the screen code data of the screen code data list into the transmission buffer 141 of the server communication section 14 in descending order of the weighted change data density. The encoding unit 55 transfers a differential region data showing the transmitted differential region to the transmission screen data updating section 13 and the weight generating section 52.

The screen data transmission server 5 can be realized by a computer, as in the case of the screen data transmission server 1 in the first exemplary embodiment. In the case of the realization by the computer, a disk and a semiconductor memory are prepared in which a software program for making a computer function as the screen data transmission server 5 is recorded, and the software program is read by the computer, for example. The computer, by controlling its own operation in accordance with the read program, realizes the screen data acquiring section 11, the differential region extracting section 122, the weight generating section 52, the priority determining section 54, the encoding unit 55, and the transmission screen data updating section 13 on the computer. It should be noted that the screen data reception client 3, which is the same as the case of the first exemplary embodiment, is not described.

Next, an operation in the present exemplary embodiment will be described in detail with reference to FIG. 21. Here, a difference from the first exemplary embodiment will be described.

Figure 7:
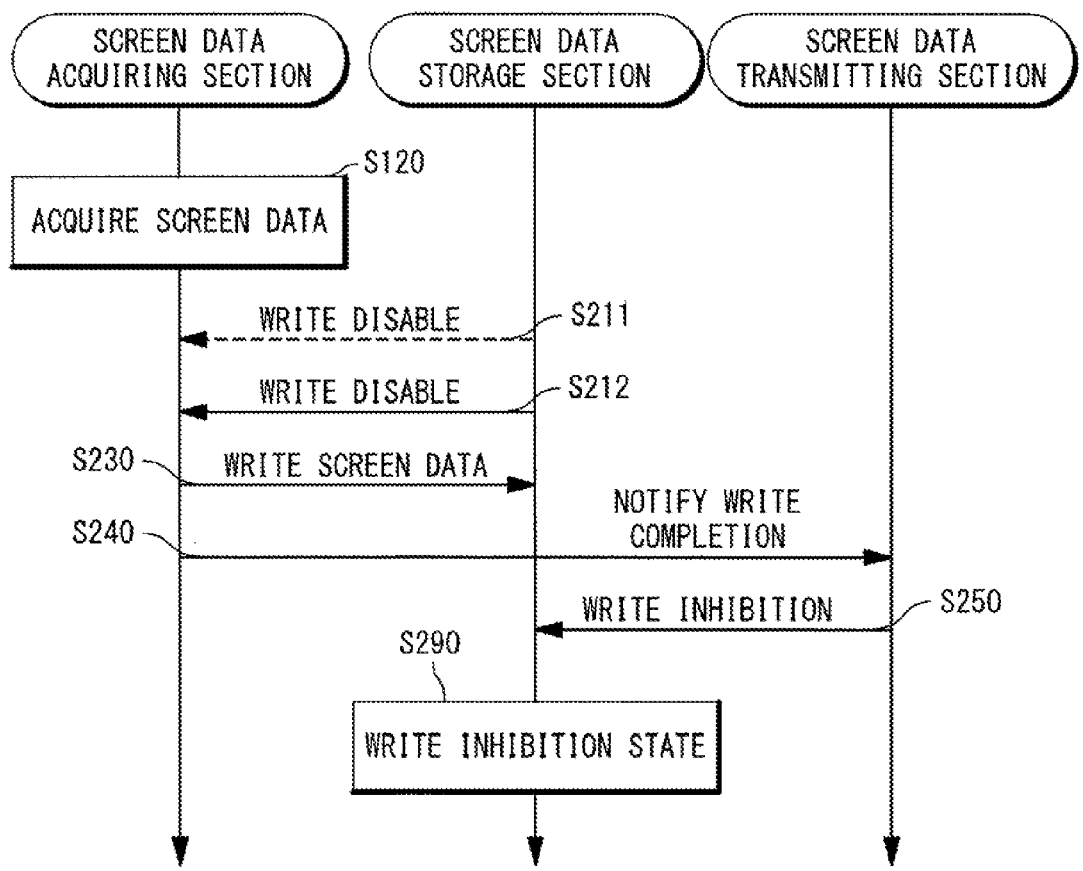
FIG. 7 is a sequence diagram showing an operation of a screen data transmitting section.

After the screen data generating section 10 generates the screen data of the current screen, the screen data of the current screen is stored in the screen data storage section 121 in the same way as the first exemplary embodiment (see FIG. 7). The differential region extracting section 122 generates the differential region data of each differential region on the current screen. The generated differential region data is transferred to the priority determining section 54 (step S310).

The priority determining section 54 transfers each differential region data to the weight generating section 52 and requests a weight for a change data density of a corresponding differential region. The weight generating section 52 calculates the weight for the change data density of the corresponding differential region based on a transmission history of a block covered by the differential region specified by the differential region data in a transmission history of each block stored in the transmission history storage section 53. The calculated weight is transmitted to the priority determining section 54 (step S410).

After receiving weight for change data density of each differential region, the priority determining section 54 executes a weighting process with the weight corresponding to the change data density of each differential region calculated by the same method as the first exemplary embodiment, and generates the weighted change data density of each differential region. After that, the priority determining section 54 generates a differential screen data list in which the differential screen data including the differential region data, the pixel data, and the weighted change data density are contained for each differential region, and transfers the differential screen data list to the encoding unit 55 (step S331).

After the differential screen data list is transferred, the encoding unit 55 generates the screen code data list shown in FIG. 4 (step S340). After that, the encoding unit 55 sends each screen code data written on the screen code data list, to the server communication section 14 in descending order of the weighted change data density, and writes the screen code data into the transmission buffer 141 (step S510).

A server communication section 14 sends the screen code data written into the transmission buffer 141 to the screen data reception client 3 in order of the write (step S570). When the transmission buffer 141 is full, the server communication section 14 issues the write disable notice to the screen data transmitting section 51 (step S580).

The encoding unit 55 sends the differential region data indicating the transmitted differential region to the weight generating section 52 and the transmission screen data updating section 13, when ending writing all the screen code data of the screen code data list into the transmission buffer 141 or when receiving the write disable notice from the server communication section 14 (step S711).

After receiving the transmitted differential region data from the encoding unit 55, the transmission screen data updating section 13 updates the transmission screen data stored in the transmission screen data storage section 124, as in the first exemplary embodiment (step S720). After that, the transmission screen data updating section 13 writes a write control data indicating a write enable state, into the screen data storage section 121 (step S770).

On the other hand, after receiving the transmitted differential region data from the encoding unit 55, the weight generating section 52 updates a transmission history of a block covered by the differential region specified by the differential region data in a transmission history of each block stored in the transmission history storage section 53 (step S730).

The other operations are the same as the first exemplary embodiment, and their description is omitted.

In the present exemplary embodiment, the weight generating section 52 manages a transmission history of each of blocks of a screen divided into the blocks, by the transmission history storage section 53. The priority determining section 54 sets as a priority, the change data density of each differential region weighted with the weight calculated based on the transmission history of the block covered by the differential region. The encoding unit 55 primarily sends the screen code data of differential regions with the larger weighted change data density. Therefore, a situation does not occur in which the screen code data of a differential region with a small degree of change in a pixel value as in a background portion of a video image is not transmitted at all, for example.

Next, the second exemplary embodiment will be described by specific examples.

Figures 22A, 22B:
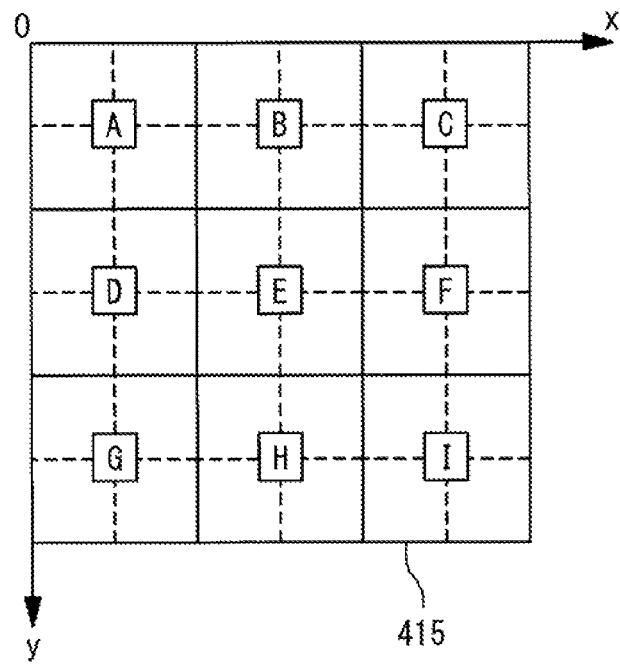
FIGS. 22A and 22B are diagrams showing a transmission history.

First, the transmission history storage section 53 will be described. In the following description, a size of the screen data generated by the screen data generating section 10 is 6 pixels long by 6 pixels wide, and a shape of a differential region is a rectangular shape:

Here, the screen data 415 is divided into blocks A to I of 2 pixels long by 2 pixels wide, as shown in FIG. 22A, and the latest transmitting times of blocks A to I are recorded as a transmission history in the transmission history storage section 53. FIG. 22B shows a configuration example of the transmission history stored in the transmission history storage section 53. The latest transmitting times are stored in the blocks A to I of the block names A to I.

Next, an updating operation for the transmission history performed by the weight generating section 52 (step S720) will be described with reference to FIGS. 23A and 23B, and FIGS. 24A and 24B.

Figures 23A, 23B:
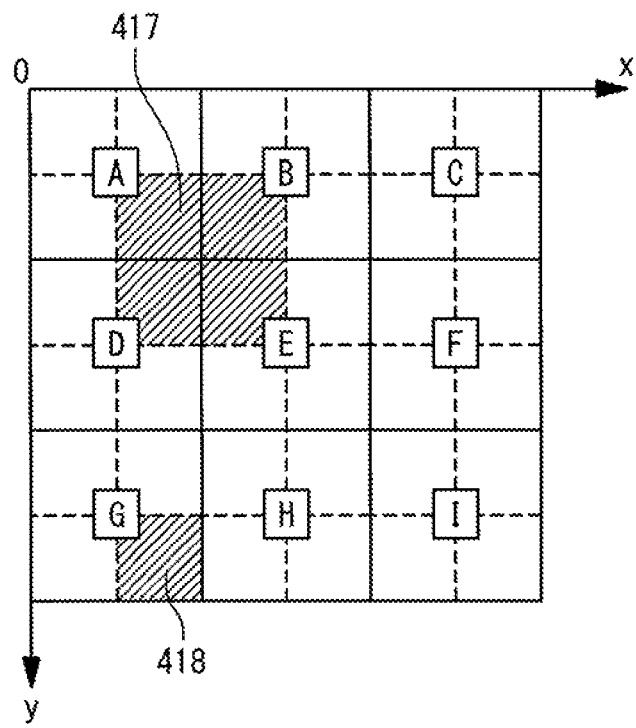
FIGS. 23A and 23B are diagrams showing an operation of a weight generating section.

As shown in FIG. 23A, it is assumed that the weight generating section 52 has received differential region data of differential regions 417 and 418 from the encoding unit 55 at 13:02:05 on Mar. 21, 2007. The differential region 417 is included in the blocks A, B, C, and D, while the differential region 418 is included in the block G. Therefore, the encoding unit 55 updates the transmission history stored in the transmission history storage section 53 as shown in FIG. 23B. As shown in FIG. 23B, the latest transmitting times of the blocks A, B, D, E, and G of the transmission history 419 are "2007/03/21 13:02:05".

Figures 24A, 24B:
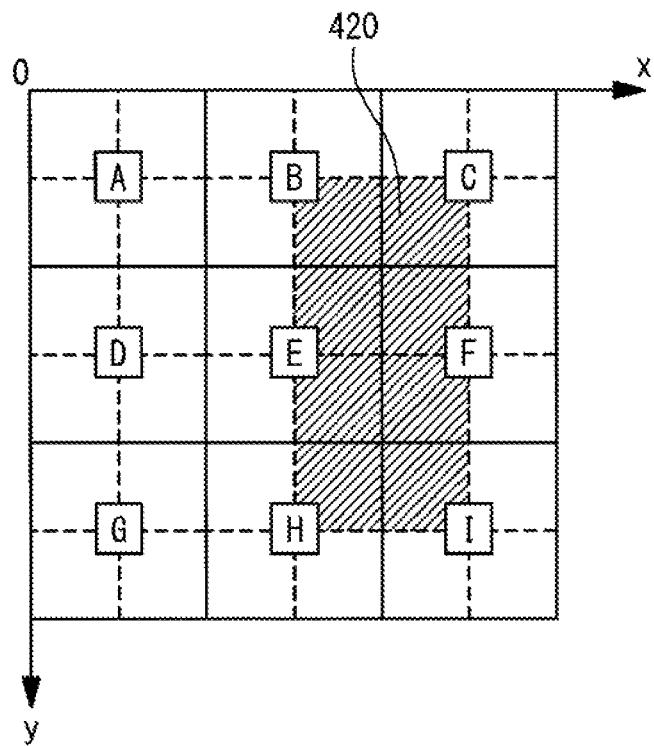
FIGS. 24A and 24B are diagrams showing the operation of the weight generating section.

After that, the weight generating section 52 receives differential region data of a differential region 420 from the encoding unit 55 as shown in FIG. 24A, at 13:02:30 on Mar. 21, 2007. Since the differential region 420 includes the blocks B, C, E, F, H, and I, the encoding unit 55 changes the transmission history stored in the transmission history storage section 53 as shown in FIG. 24B. In the transmission history 421 shown in FIG. 24B, the latest transmitting times of the blocks B, C, E, F, H, and I are "2007/03/21 13:02:30".

Figures 25A, 25B:
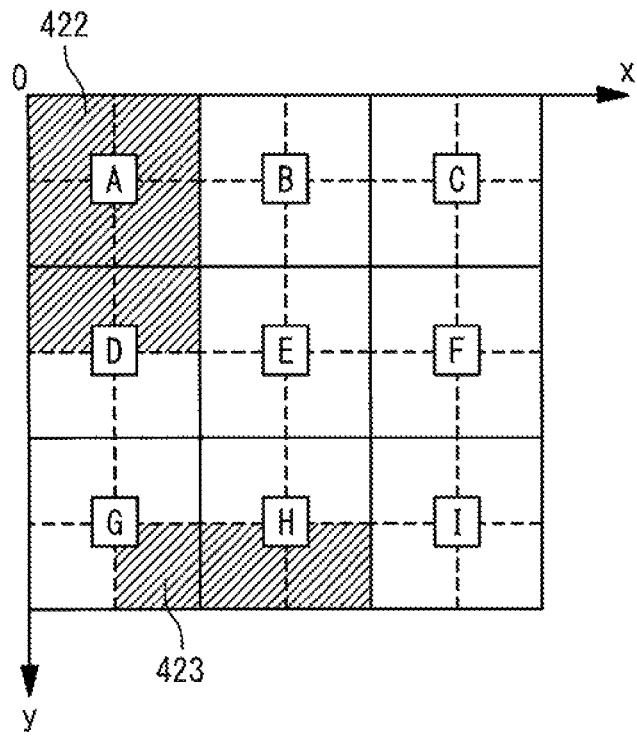
FIGS. 25A and 25B are diagrams showing the operation of the weight generating section.

Next, a weight generating process, namely, calculation of a weight for a change data density of a differential region (step S410) will be described with reference to FIGS. 25A and 25B. It is assumed that when the transmission history is updated as mentioned above, the priority determining section 54 requests the weights for the change data densities of differential regions 422 and 423 shown in FIG. 25A. The time at this time is 13:02:40 on Mar. 21, 2007.

The weight generating section 52 receives the differential region data, and then finds a block that includes the greatest number of pixels of the differential region for each of the differential regions 422 and 423. After that, the weight generating section 52 acquires the latest transmitting time of the block from the transmission history storage section 53, and regards the latest transmitting time as the latest transmitting time of the differential region. When there are a plurality of blocks that include the greatest number of pixels per a differential region, the weight generating section 52 acquires the latest transmitting times in the blocks from the transmission history storage section 53 and regards the latest transmitting time as the latest transmitting time of the differential region. When the latest transmitting time of a block for a differential region is not recorded in the transmission history storage section 53, the latest transmitting time of the differential region is regarded as "no record". In the case of FIG. 25A, blocks that include the greatest number of pixels in the differential regions 422 and 423 are the blocks A and H, respectively. The weight generating section 52 regards the latest transmitting times "2007/03/21 13:02:05" and "2007/03/21 13:02:30" of the blocks A and H as the latest transmitting times of the differential regions 422 and 423.

After that, the weight generating section 52 obtains a difference between the current time and the latest transmitting time of a differential region, namely, an elapsed time, for each of the differential regions 422 and 423. The weight generating section 52 uses these elapsed times as weights for change data densities of the differential regions 422 and 423. As for a differential region with "no record", the weight generating section 52 uses an integer (e.g. 65535) like a maximum possible weight number as the weight. As for the differential region 422, the weight is "35" since the elapsed time is "35 seconds", which is a difference between "2007/03/21 13:02:40" and "2007/03/21 13:02:05". As for the differential region 423, the weight is "10" since the elapsed time is "10 seconds", which is a difference between "2007/03/21 13:02:40" and "2007/03/21 13:02:30".

Next, a differential screen data list generating process (step S331), and screen code data list generating and transmitting processes (steps S340 and S510) will be described. The differential region 422 shown in FIG. 25A is a region with a low degree of change in pixel value, and the differential region 423 is a region with a high degree of change in pixel value.

The priority determining section 54 receives the weights w1 and w2 for change data densities of the differential regions 422 and 423 from the weight generating section 52, conducts calculation shown by the following formulae (2) and (3), to calculate the weighted change data densities h1 and h2 for the differential regions 422 and 423.

$$h1 = (\text{change data density of the differential region } 422) * w1 \quad (2)$$

$$h2 = (\text{change data density of the differential region } 423) * w2 \quad (3)$$

Here, the change data density becomes greater as a total of change amounts of the differential regions is greater and becomes greater as an area of the differential region is smaller, as mentioned above. Immediately after initiation of the operation of the screen data transmission server 5, the latest transmitting times of the differential regions 422 and 423 are not different so much and the weight w1 and w2 are also similar values. Therefore, the image data of the differential region 423 with a great degree of change in pixel value and with a small area, is primarily transmitted. For this reason, in the narrowband environment, the image data of the differential region 422 is sometimes scarcely transmitted to the screen data reception client 3. Since even in such a situation, the image data of the differential region 422 is not transmitted when a time has elapsed after the starting of the screen data transmission server 5, an elapsed time is increased and the weight w1 is gradually larger while the weight w2 does not change so much. Therefore, the weighted change data density h1 is greater than the weighted change data density h2, and accordingly the image data of the differential region 422 is primarily transmitted.

The other operations are the same as in the first exemplary embodiment, and the description thereof is omitted.

Third Exemplary Embodiment

Next, the third exemplary embodiment of the present invention will be described in detail. In the exemplary embodiment, a priority at the time of transmitting the image data of a differential region is determined based on the change data density weighted with the weight in accordance with an operation performed by a user (weighted change data density). Therefore, it is possible to primarily transmit the image data of a differential region that is highly relevant to the operation performed by a user of the screen data reception client.

FIG. 26 is a block diagram showing a configuration example of the screen data transmitting system according to a third exemplary embodiment. The difference from the first exemplary embodiment shown in FIG. 1 is in that a screen data transmission server 6 is provided instead of the screen data transmission server 1 and in that a screen client 7 is provided instead of the screen data reception client 3.

The screen data transmission server 6 is different from the screen data transmission server 1 in that an operational data acquiring unit 62 is added and in that a priority determining section 63 and a server communication section 64 are provided instead of the priority determining section 123 and the server communication section 14, respectively. The screen data reception client 7 is different from the screen data reception client 3 in that an operational data inputting unit 71 is added and in that a client communication unit 72 is provided instead of the client communication section 33.

The operation data input section 71 acquires an operational data from an input device such as a mouse and a keyboard (not shown), and transfers the acquired operation data to the client communication section 72. The client communication section 72 has a function to send the operation data transferred from the operation data input section 71, to the server communication section 64 in the screen data transmission server 6, in addition to the functions of the client communication section 33.

Here, the operation data is a data showing the contents of operations performed by a user of the screen data reception client 7 for a screen data displayed on a screen data outputting section 31, and exemplified by data such as a coordinate value of a cursor, a movement speed of a cursor, and a key operation frequency (the number of times of operations per unit time).

The server communication section 64 has a function to transfer the operation data from the client communication section 72 to the operation data acquiring section 62, in addition to the functions of the server communication section 14. A transmission buffer 641 in the server communication section 64 has the same functions as the transmission buffer 141 shown in FIG. 1.

The operation data acquiring section 62 holds the operation data transferred from the server communication section 64 and transfers the held operation data to the priority determining section 63 when requested from the priority determining section 63.

The priority determining section 63 calculates the change data density for each differential region extracted by the differential region extracting section 122 and further weights the calculated change data density of each differential region by using a weight indicating relevance to a user operation, to calculate the weighted change data density. That is to say, the weight indicating relevance to the user operation is a weight in accordance with the operation data acquired from the operation data acquiring section 62 and a data peculiar to each differential region (e.g. coordinate values of the center of gravity or an area), and is a greater value with a differential region having higher relevance to the operation performed by a user. After that, the priority determining section 63 generates a differential screen data list, which is a set of the differential region data, the pixel data, and the weighted change data density, for each differential region. The generated differential screen data list is transmitted to the encoding section 125. The differential screen data list generated at this time is approximately the same as the differential screen data list shown in FIG. 3, but is different in that the weighted change data density is included instead of the change data density.

The following can be used as a weight which is a greater value with a differential region having higher relevance to the operation performed by a user. When the operation data is coordinate values indicating a position of a cursor, for example, a inverse number of a distance between a cursor position and a position of the center of gravity of a differential region can be used as a weight. When the operation data shows a movement speed of a cursor, the weight that is 1 when movement speed is less than a threshold value and that is a greater value as an area of a differential region is smaller when movement speed is a threshold value or above, can be used. When the operation data shows a key operation frequency, the weight is 1 when the operation frequency is less than a threshold value and is a greater value as the area of the differential region is smaller when the operation frequency is the threshold value or above.

When coordinate values of a cursor is used as the operation data and a reciprocal number of a distance between the cursor position and a position of the center of gravity of the differential region is used as a weight, data of the differential region close to a position of a user operation is primarily transmitted. For this reason, when a user operates an icon, it is possible to promptly notify change in the display state of the icon to the user, for example. When a movement speed of the cursor is used as the operation data, and the weight is 1 if the movement speed is less than a threshold value and is a greater value as the area of the differential region is smaller if the movement speed is the threshold value or above, a way of change in a line segment drawn on a screen can be smooth, for example. When a user draws a picture by using a paint software program, the movement speed of the cursor is the threshold value or above, and the weight is greater as the area of the differential region is smaller. For this reason, the line segment that has newly been drawn by a user is primarily transmitted, making it possible to smooth a way of change in a line segment drawn by the user. When the key operation frequency is used as the operation data, and the weight is 1 if the operation frequency is less than a threshold value and is a greater value as the area of the differential region is smaller if the operation frequency is the threshold value or above, it is possible to promptly display characters key-inputted by the user, for example. If the user enters the characters by using the keys, the key operation frequency is the threshold value or above, and the weight is greater as the area of the differential region is smaller. Therefore, the characters newly inputted by the user are primarily transmitted and accordingly the characters inputted by the user by use of the keys can be promptly displayed.

The screen data transmission server 6 and the screen data reception client 7 of the exemplary embodiment can be realized by a computer, in the same way as the above-mentioned exemplary embodiments.

Figure 27:
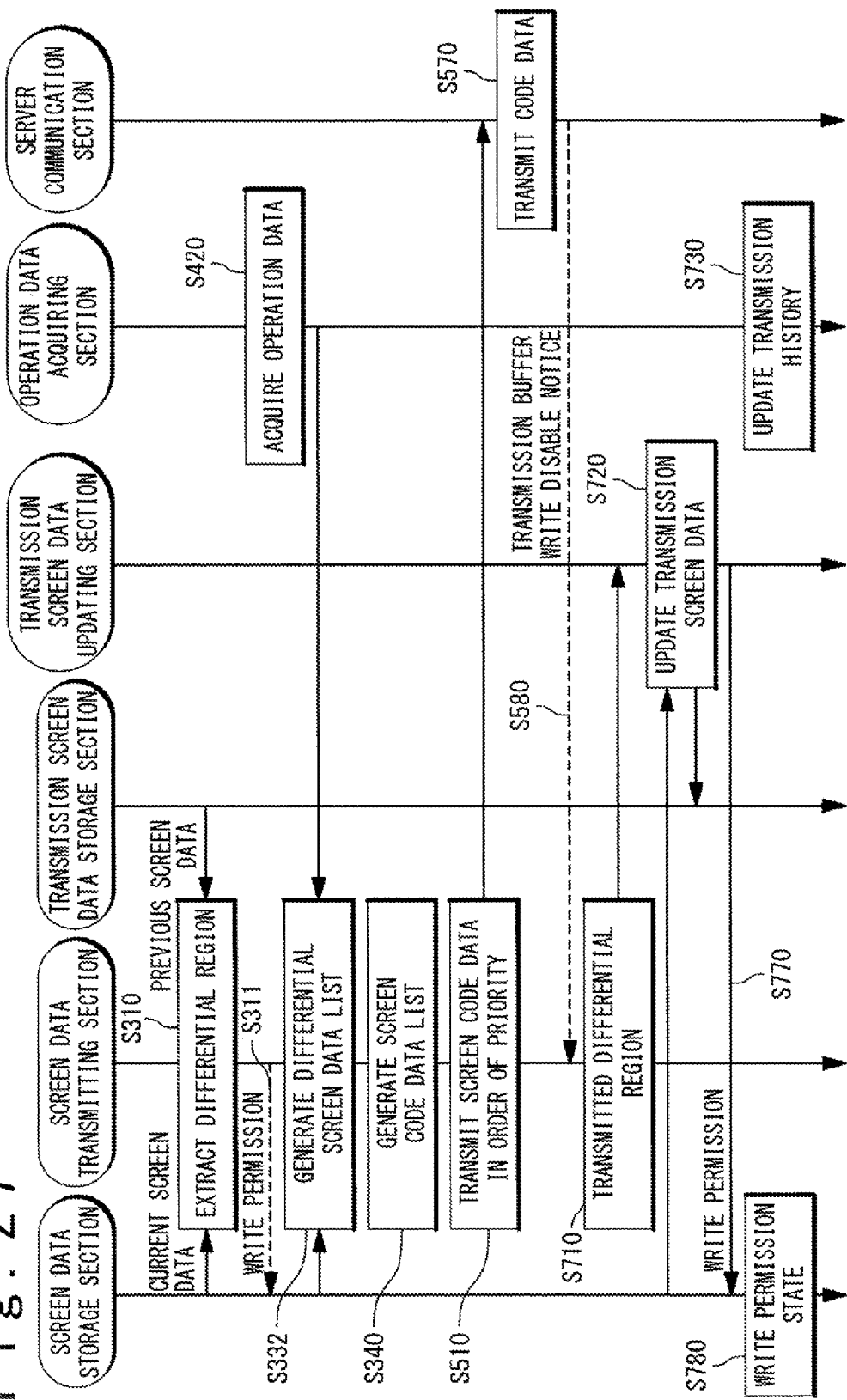
FIG. 27 is a sequence diagram showing an operation of the screen data transmission server.

Next, the operation in the present exemplary embodiment will be described in detail with reference to FIG. 27. Here, a difference from the first exemplary embodiment will be described. The operation when the screen data of the current screen generated by the screen data generating section 10 is stored in the screen data storage section 124 is the same as the operation shown in FIG. 6, and the description thereof is omitted.

The differential region extracting section 122 extracts the differential region on the current screen and transfers each generated differential region data to the priority determining section 63 (step S310).

The priority determining section 63 receives the differential region data from the differential region extracting section 122, and acquires pixel data of each differential region from the screen data storage section 121 based on the differential region data. The priority determining section 63 calculates a change data density for each differential region based on the pixel data. Additionally, an operation data is obtained from the operation data acquiring section 62 and a weight for each differential region is calculated based on the operation data and a data peculiar to each differential region (e.g. coordinate values of the center of gravity, and an area).

Further, the priority determining section 63 multiplies the calculated change data density by the weight, to calculate the weighted change data density for each differential region. After that, as shown in FIG. 3, a differential screen data list is generated and the differential screen data list is transferred to the encoding section 125 (step S332). The encoding section 125 generates a screen code data list (step S340) in the same way as the second exemplary embodiment, and sends the screen code data to the screen data reception client 7 in descending order of the weighted change data density as a priority (step S510).

The other operations are the same as in the first exemplary embodiment, and the description thereof is omitted.

In the present exemplary embodiment as mentioned above, the priority determining section 63 calculates a weight for a change data density of each differential region based on the operation data transmitted from the screen data reception client 7. The encoding section 125 sends the image code data in descending order of the weighted change data density. Therefore, the image code data of a differential region highly relevant to the operation performed by the user is primarily transmitted. As a result, responsibility to the user operation can be improved.

Next, the third exemplary embodiment will be described by use of specific examples. Here, coordinate values indicating a position of a mouse cursor are used as the operation data.

Figure 28A:
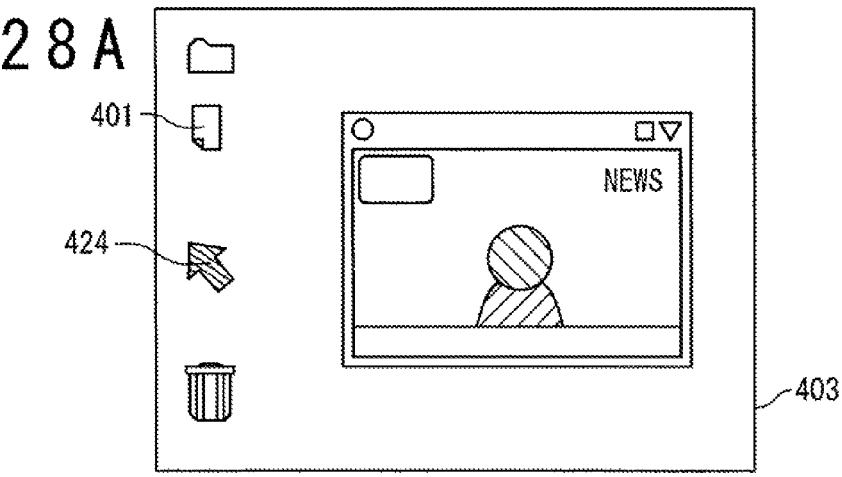
FIGS. 28A to 28C are diagrams showing an operation of a priority determining section.
Figure 28B:
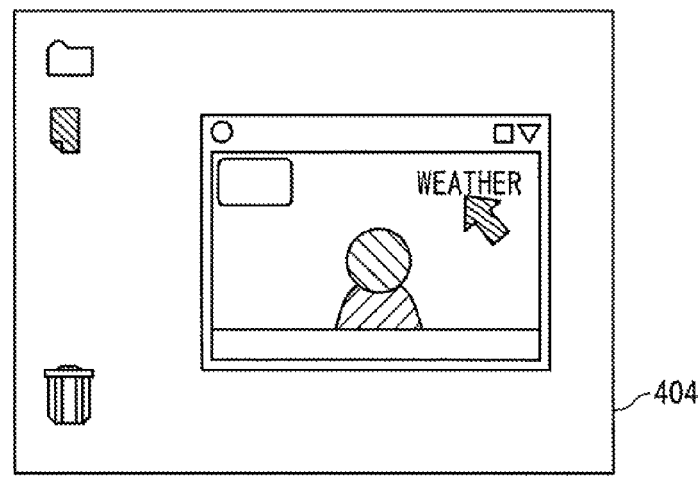
Figure 28C:
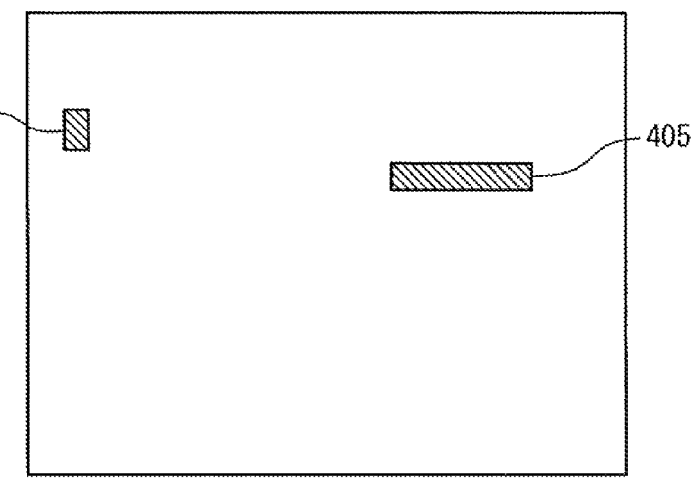

A screen data 403 of the current screen is stored in the screen data storage section 121 as shown in FIG. 28A, and a screen data 404 of the previous screen is stored in the transmission screen data storage section 124 as shown in FIG. 28B. The differential region extracting section 122 extracts differential regions 405 and 406 as shown in FIG. 28C, and sends the differential region data to the priority determining section 63 (step S310).

The priority determining section 63 receives the differential region data of the differential regions 405 and 406, then acquires pixel data of the differential regions 405 and 406 from the screen data storage section 121 and calculates change data densities of the differential regions 405 and 406. Additionally, it is assumed that the priority determining section 63 acquires coordinate values of a mouse cursor 424 shown in FIG. 28A as an operation data from the operation data acquiring section 62.

After that, the priority determining section 63 performs calculation shown in the following equations (4) and (5), to calculate weights w5 and w6 for the change data densities of the differential regions 405 and 406.

$$w5 = 1/(\text{a distance between a position of the center of gravity of the differential region 405 and the mouse cursor 424}) \quad (4)$$

$$w6 = 1/(\text{a distance between a position of the center of gravity of the differential region 406 and the mouse cursor 424}) \quad (5)$$

Here, since the position of the center of gravity of the differential region 406 is closer to the mouse cursor 424 than the position of the center of gravity of the differential region 405, the weight w6 for the change data density of the differential region 406 is greater than the weight w5 for the change data density of the differential region 405.

After that, the priority determining section 63 performs calculation shown in the following equations (6) and (7) for each of the differential regions 405 and 406, to calculate the weighted change data densities h5 and h6 for the differential regions 405 and 406.

$$h5 = (\text{change data density of the differential region 405}) * w5 \quad (6)$$

$$h6 = (\text{change data density of the differential region 406}) * w6 \quad (7)$$

After that, the priority determining section 63 generates a differential screen data list that includes the differential screen data and the weighted change data densities of the differential regions 405 and 406, and sends the differential screen data list to the encoding section 125. The encoding section 125 generates a screen code data list based on the differential screen data list and sends the screen code data to the screen data reception client 7 in descending order of the weighted change data density.

The other operations are the same as in the first exemplary embodiment, and the description thereof is omitted.

Through the above operation, a change in a screen due to a user operation such as icon selection is primarily transmitted to the screen data reception client even during replay of a video image. Therefore, transmission of the change in a screen as the result of a user operation response, is not disrupted by differential screen data due to video images even in the narrowband environment, and the change in a region in screen data targeted for the user operation can primarily be transmitted. That is to say, responsibility to the user operation can be improved.

Fourth Exemplary Embodiment

Next, a fourth exemplary embodiment of the present invention will be described in detail with reference to drawings. In the present exemplary embodiment, a screen code data with a size in accordance with communication capacity of a screen data transmission server is written into a transmission buffer. For this reason, transfer of newly-generated screen code data is not disturbed due to old screen code data.

Figure 29:
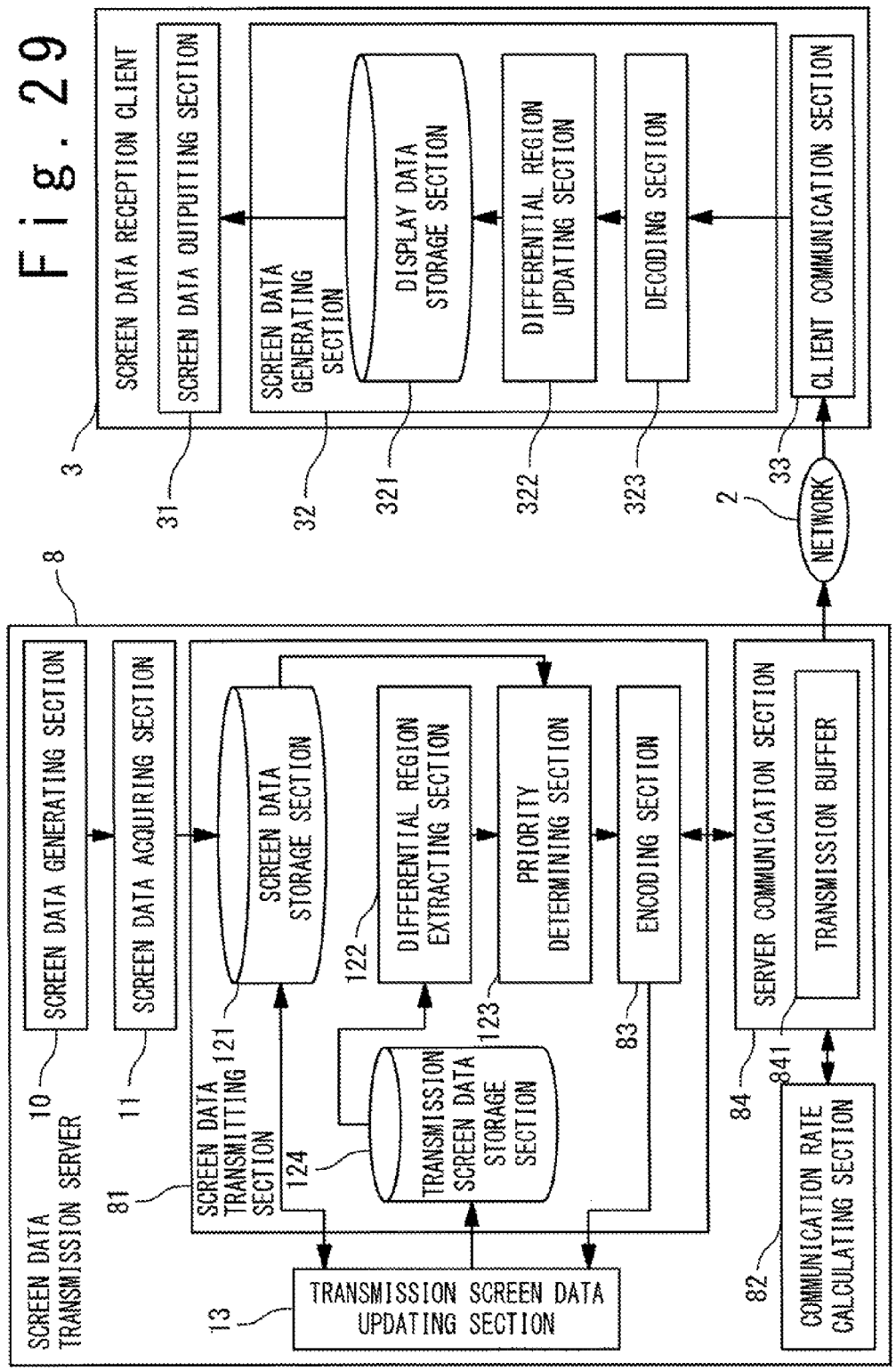
FIG. 29 is a block diagram showing a configuration example of the screen data transmitting system according to a fourth exemplary embodiment of the present invention.

FIG. 29 is a block diagram showing a configuration example of the screen data transmitting system according to a fourth exemplary embodiment of the present invention. The difference from the first exemplary embodiment shown in FIG. 1 is in that a screen data transmission server 8 is provided instead of the screen data transmission server 1.

The screen data transmission server 8 is different from the screen data transmission server 1 in that a screen data transmitting unit 81 is provided instead of the screen data transmitting section 12, in that a server communication unit 84 is provided instead of the server communication section 14, and in that a communication rate calculating section 82 is added. The screen data transmitting section 81 is different from the screen data transmitting section 12 in that an encoding section 83 is provided instead of the encoding section 125.

The server communication section 84 having a transmission buffer 841 has a function to maintain communication record data in addition to the functions of the server communication section 14. As the communication record data, a data size of the transmitted data and a time required to transmit (transmission time period) can be used, for example.

The communication rate calculating section 82 calculates a communication rate of the server communication section 84 based on communication record data held by the server communication section 84. When the data size and the transmission time period of data transmitted by the server communication section 84 are held as a communication record data, the communication rate can be calculated by the following equation:

(communication rate)=(data size)*(transmitting time).

When writing a screen code data of a screen code data list into the transmission buffer 841 of the server communication section 84, the encoding section 83 determines a data size (maximum data size) of the screen code data to be written. The data size is calculated based on a communication rate calculated by the communication rate calculating section 82 and an elapsed time from a time when the latest write is performed to the current time. The encoding section 83 writes the maximum number of screen code data into the transmission buffer 841 in descending order of the change data density without exceeding a decided maximum data size. When a write disable notice is issued from the server communication section 84, the write process is ended at that point.

The maximum data size is calculated by performing the following calculation: (communication rate)*(elapsed time), for example. Although not shown, the encoding section 83 has therein a time holding section for holding a time when the latest write is performed. The encoding section 83 calculates the elapsed time from the latest write time held in the time holding section to the current time at the time of write of screen code data, and writes the current time at that time into the time holding section.

Additionally, the screen data transmission server 8 of the present exemplary embodiment can be realized by a computer in the same way as the screen data transmission server 1.

Figure 30:
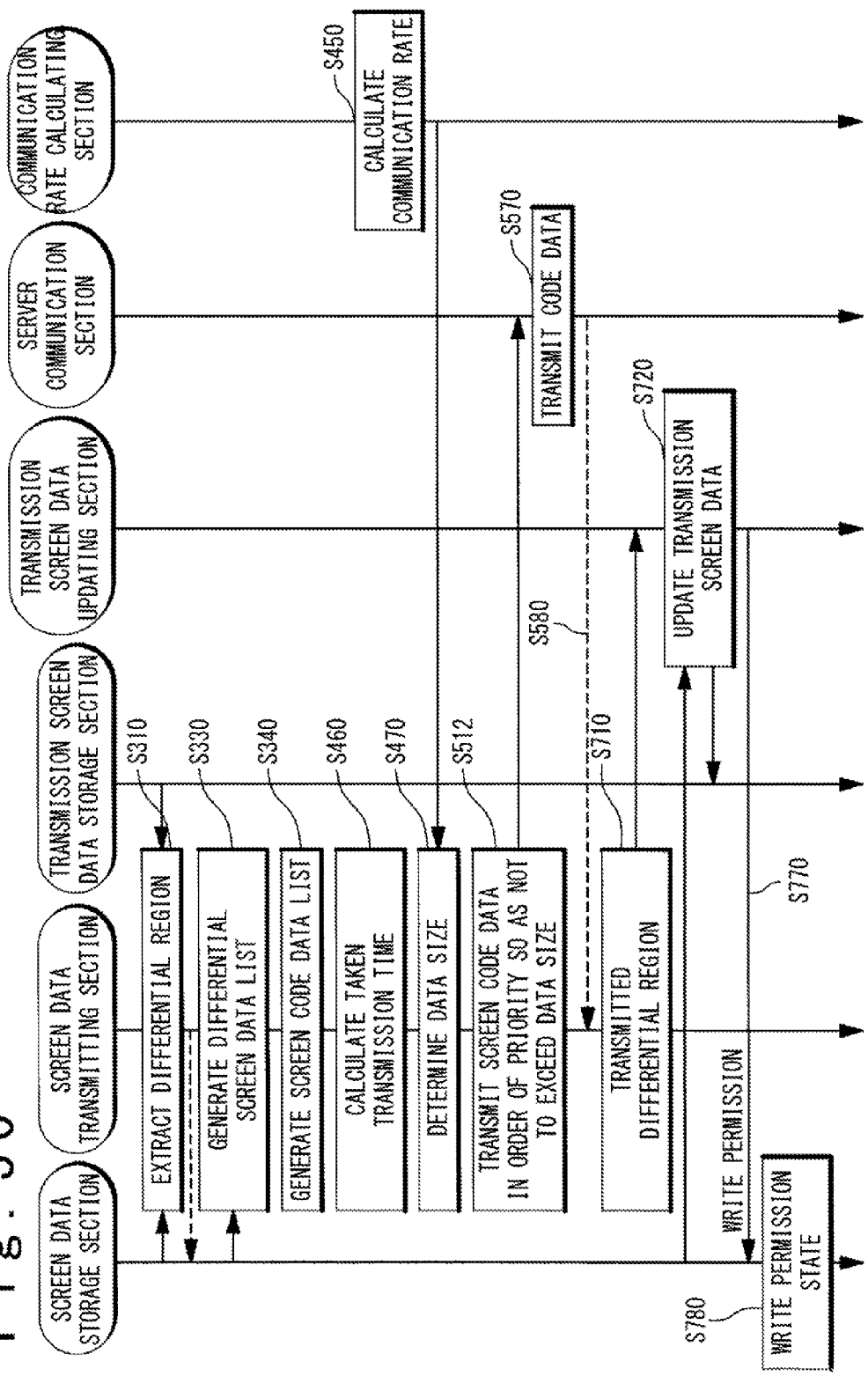
FIG. 30 is a sequence diagram showing an operation of the screen data transmission server.

Next, an operation of the present exemplary embodiment will be described with reference to FIG. 30. Here, a difference from the first exemplary embodiment will be described.

The encoding section 83 receives a differential screen data list (see FIG. 3) from a priority determining section 123, and then generates a screen code data list (see FIG. 4) (step S340).

After that, the encoding section 83 calculates a transmission elapsed time from the latest write time kept in the time maintaining section, to the present time (step S460). Additionally, the communication rate calculating section 82 calculates communication rate of the server communication section 84 (step S450) based on communication record data held by the server communication section 84 as mentioned above. The encoding section 83 multiplies communication rate acquired from the communication rate calculating section 82 and the calculated transmitting elapsed time together, and determines a maximum data size of the screen code data written into the transmission buffer 841 (step S470).

After that, the encoding section 83 writes the screen code data written on a screen code data list into the transmission buffer 841 in descending order of the change data density as priority at the time of transmitting. At this time, the encoding section 83 writes the maximum number of the screen code data into the transmission buffer 841 without exceeding the determined maximum data size (step S512).

The server communication section 84 sends the screen code data written into the transmission buffer 841, to the screen data reception client 3 in order of the write (step S570).

On the other hand, the encoding section 83 writes all the screen code data corresponding to the maximum data size into the transmission buffer 841 or receives a write disable notice from the server communication section 84, and then transfers the differential region data already written into the transmission buffer 841, to the transmission screen data updating section 13 (step S710). Consequently, the transmission screen data updating section 13 updates the screen data stored in the transmission screen data storage section 124 (step S720).

The other operations are the same as in the first exemplary embodiment, and the description thereof is omitted.

According to the present exemplary embodiment, the following effect can be obtained in addition to the effect obtained in the first exemplary embodiment. In the present exemplary embodiment, since the encoding section 83 determines the data size of the screen code data written into the transmission buffer 841 based on a communication rate of the server 8 calculated by the communication rate calculating section 82 and an elapsed time from the latest write time, and writes the screen code data of each differential region into the transmission buffer 841 in descending order of the change data density within the determined data size, it is possible to reduce a time during which old screen code data continues to exist in the transmission buffer 841 when communication capacity of the screen data transmission server 8 is low. Therefore, it is possible to obtain effect to reduce a delay time until a change in screen data generated by a screen data generating section 10 is transmitted to the screen data reception client 3.

Fifth Exemplary Embodiment

Next, the fifth exemplary embodiment of the present invention will be described in detail. In the present exemplary embodiment, a screen code data of a large size is transmitted by dividing into several division code data. For this reason, transmitting of the screen code data in a high change data density is performed promptly even during transmitting of the screen code data of a large size, and after the promptly-transmitted screen code data is received, the received screen code data is promptly decoded.

Figure 31:
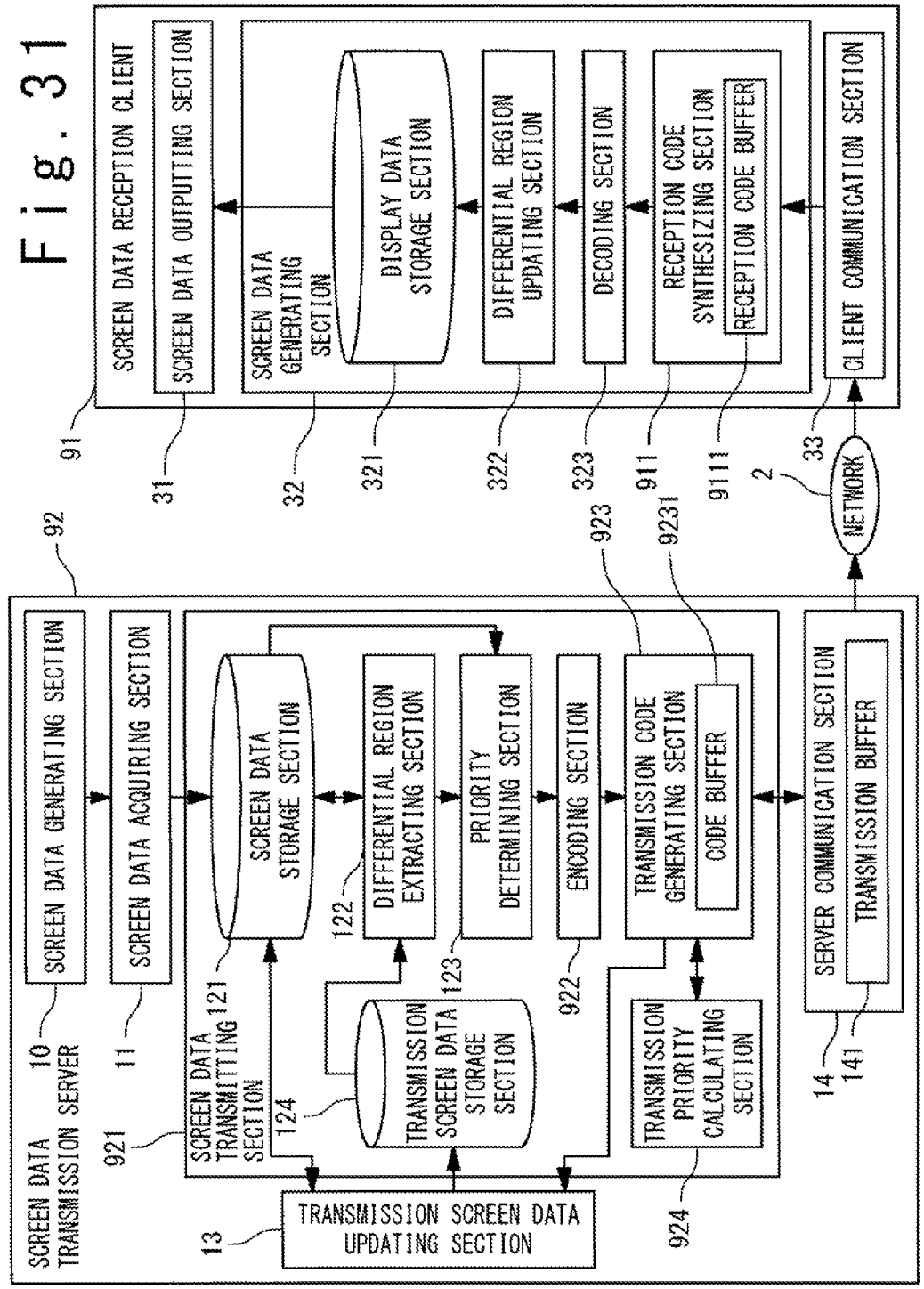
FIG. 31 is a block diagram showing a configuration example of the screen data transmitting system according to a fifth exemplary embodiment of the present invention.

FIG. 31 is a block diagram showing a configuration example of a screen data transmitting system according to the present exemplary embodiment. The screen data transmitting system according to the present exemplary embodiment has a screen data transmission server 92 and a screen data reception client 91, and the screen data transmission server 92 and the screen data reception client 91 are connected through a network 2.

The screen data transmission server 92 is different from the screen data transmission server 1 shown in FIG. 1 in the following points. That is to say, a transmission code generating section 923 includes a transmission-target code buffer 9231, and a transmission priority calculating section 924; an encoding section 922 generates a screen code data list with a change data density instead of a screen code data list generated by the encoding section 125; a generated screen code data list with the change data density is transmitted to the transmission code generating section 923, and the transmission code generating section 923 generates transmission-target code data based on the screen code data list with the change data density and a transmission priority calculated by the transmission priority calculating section 924, and notifies the generated transmission-target code data to a server communication section 14; and the transmission code generating section 923 notifies the transmitted differential region data to the transmission screen data updating section 13.

The screen data reception client 91 is different from the screen data reception client 3 shown in FIG. 1 in the following points. That is to say, a reception code synthesizing section 911 includes a reception code buffer 9111; and the reception code synthesizing section 911 receives division code data from the client communication section 33 and sends the screen code data generated based on reception data to a decoding section 323.

Figure 32:
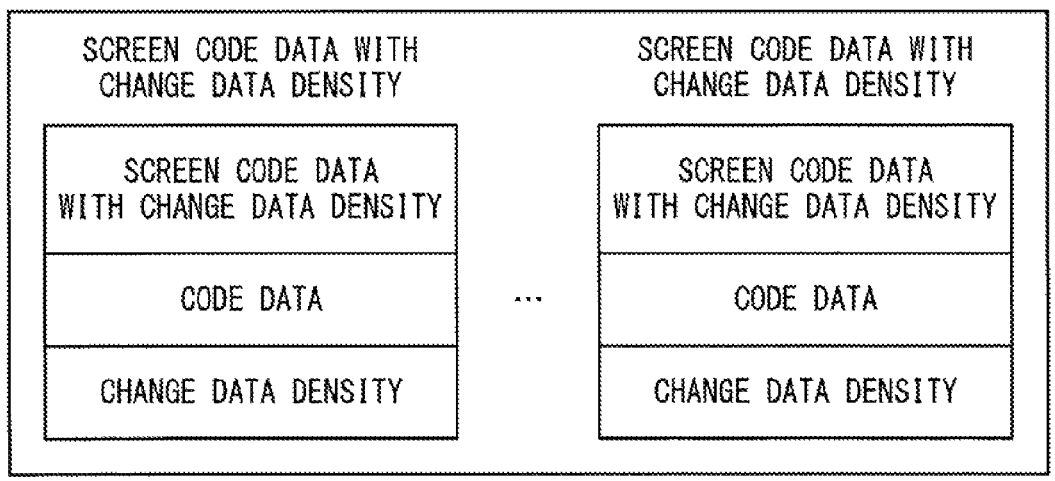
FIG. 32 shows an example of a screen code data with a change data density.

The encoding section 922 receives a differential screen data list from the priority determining section 123, and then generates a screen code data list with a change data density. A differential screen data list includes one or several of differential screen data, and each differential screen data includes the differential region data, the pixel data, and the change data density, as shown in FIG. 3. The screen code data list with the change data density includes one or several of screen code data with the change data density, and each screen code data with the change data density has the differential region data, the code data, and the change data density, as shown in FIG. 32. Each screen code data with the change data density has one-to-one correspondence relation to the differential screen data in a differential screen data list. Therefore, each screen code data with the change data density has the code data obtained by encoding the pixel data of corresponding differential screen data by use of image encoding methods such as the JPEG, and the differential region data that is the same as the differential region data of the corresponding differential screen data. Furthermore, each screen code data with the change data density has a change data density having one-to-one correspondence relation to the change data density of differential screen data.

The transmission code generating section 923 acquires the screen code data list with the change data density from the encoding section 922, and generates the transmission-target code data based on the screen code data of the screen code data list with the change data density. At this time, the transmission code generating section 923 divides the screen code data such that the data size of the screen code data is a predetermined size or below to generate the division code data, and writes the transmission-target code data including the generated division code data into the transmission-target code buffer 9231. Sending priority to be mentioned later, is set to the transmission-target code data. Additionally, connection order data, which is a data indicating order of connection of the division code data to generate original screen code data, is given to the transmission-target code data. The connection order data is numbers counted from 1, for example. Additionally, the connection order data also includes a data indicating the last connection order. To the division code data connected last, a negative number obtained by reversing a code of number given in order, is given as the connection order data, for example. When the connection order data is numbers counted from 1, the transmission-target code data indicating that the connection order data is the division code data at the first position, means to select the transmission-target code data in which an absolute value of the connection order data of the division code data is the smallest value, among transmission-target code data written into the transmission-target code buffer 9231, for example.

After ending generating the transmission-target code data, the transmission code generating section 923 sends the transmission-target code data through the server communication section 14 in descending order of the transmission priority.

If a data has been written into the transmission-target code buffer 9231 when receiving the screen code data list with the change data density, the transmission code generating section 923 selects the transmission-target code data indicating the smallest connection order data of the division code data included in the transmission-target code data, and sends the selected transmission-target code data to the server communication section 14. That is to say, the image data of the differential region being in the course of transmission is transmitted.

Furthermore, when transmitting the transmission screen code data that has not been divided, or when transmitting the division code data that includes the connection order data indicating that the connection order data in the division code data is the last, the transmission code generating section 923 notifies the differential region data corresponding to the transmitted screen code data or the division code data as the transmitted differential region to the transmission screen data updating section 13. Additionally, when the division code data is transmitted, the transmission code generating section 923 deletes the transmission-target code data from transmission-target code buffer 9231. Further, when receiving a transmission buffer write disable notice from the server communication section, the transmission code generating section 923 deletes the transmission-target code data from the transmission-target code buffer 9231 excluding the transmission-target code data corresponding to the differential region in the course of transmission of the image data. That is to say, when two or above of the transmission-target code data with the same differential region data are in the transmission-target code buffer 9231 and the connection order data of the division code data includes the connection order data (e.g. "1") of the division code data firstly connected when connecting the division code data to generate the screen code data, the transmission-target code data with the same differential region data is deleted from the transmission-target code buffer 9231. In addition, the transmission-target code data including the screen code data that has not been divided is also deleted from the transmission-target code buffer 9231.

The transmission-target code data includes the screen code data or the division code data obtained by dividing the screen code data, transmission priorities thereof, and the differential region data. That is to say, the division code data has a data obtained by dividing the code data of the screen code data to be a given data size or below, the differential region data, and the connection order data. As the size of the division code data, a value obtained by dividing an available communication band by the number of times of screen update per unit time is used, for example. It is preferable that the number of times of screen update per unit time be set by a user.

The transmission priority calculating section 924 acquires the size of code data, the division code data size, the division code data, and the change data density of the screen code data from the transmission code generating section 923, and generates a transmission priority for each division code data.

The transmission priority is obtained by dividing the change data density by the number of divisions, for example. When a differences between transmission priorities need to be obtained in detail, the transmission priority may be calculated by use of a value obtained by dividing the size of the code data of the screen code data by the division code data size. Therefore, the transmission priority of the division code data is a value smaller than the change data density. That is to say, the transmission priority is lowered as the number of division is larger.

In the screen data reception client 91, the reception code synthesizing section 911 receives the division code data or the screen code data from the client communication section 33. After receiving the screen code data, the reception code synthesizing section 911 sends the received screen code data to the decoding section 323. Additionally, the reception code synthesizing section 911 receives division code data, and then writes the received division code data into the reception code buffer 9111. When the connection order data of the written division code data indicates the last position in the order, the reception code synthesizing section 911 connects the division code data in the reception code buffer 9111 based on the connection order data to generate the screen code data, and sends the generated screen code data to the decoding section 322.

The screen data transmission server 92 and the screen data reception client 91 in the present exemplary embodiment can also be realized by a computer in the same way as the above-mentioned exemplary embodiments.

Next, an operation of the screen data transmission server 92 will be described in detail with reference to FIG. 33 and FIG. 34. Here, a difference from the first exemplary embodiment will be described. Therefore, steps after the step S330 shown in FIG. 8 will be described with reference to FIG. 33.

Figure 33:
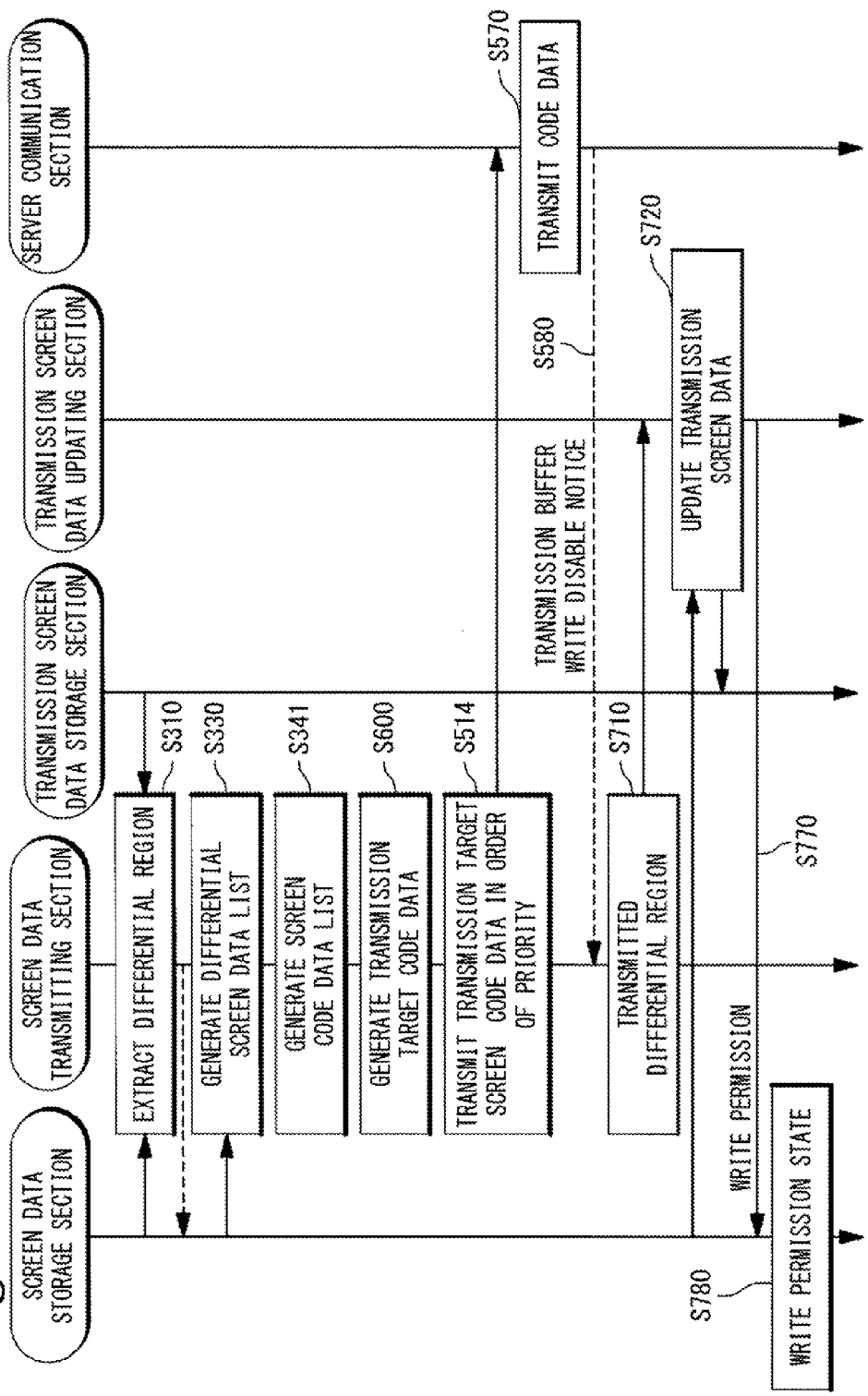
FIG. 33 is a sequence diagram showing an operation of the screen data transmission server.
Figure 34:
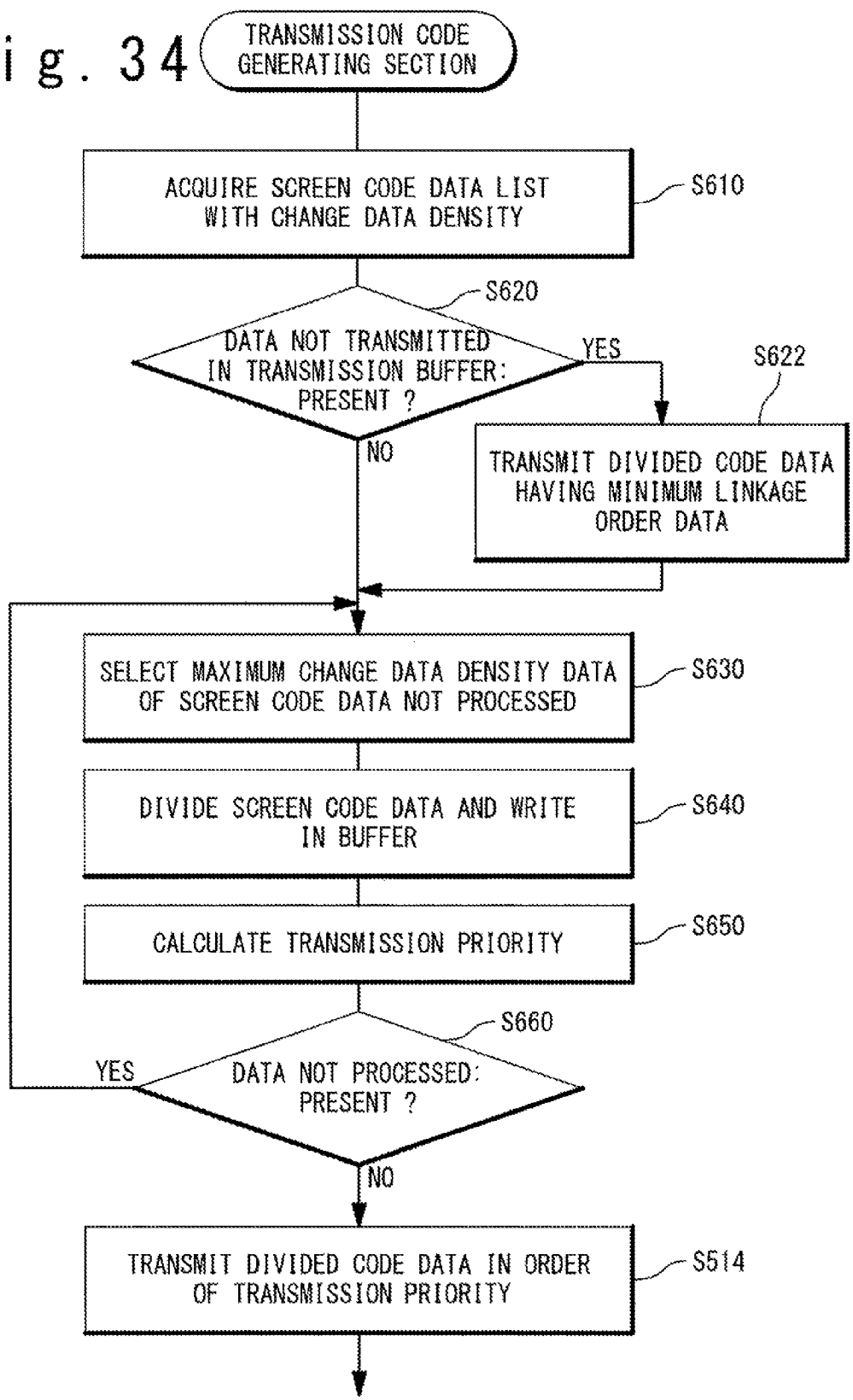
FIG. 34 is a flow chart showing an operation of a transmission code generating section.

As shown in FIG. 33, the encoding section 922 receives the differential screen data list from the priority determining section 123, and then generates the screen code data list with the change data density. The generated screen code data list with the change data density is transferred to the transmission code generating section 923 (step S341).

The transmission code generating section 923 generates the transmission-target code data based on the screen code data of the screen code data list with the change data density acquired from the encoding section 922 (step S600).

The transmission code generating section 923 transfers the screen code data or the division code data of the transmission-target code data to the server communication section 14 in descending order of the transmission priority (step S514). The server communication section 14 writes the received screen code data or division code data into the transmission buffer 141, which are then transmitted to the screen data reception client 91 through the network 2 in order (step S570). When the transmission buffer 141 has no free space left, the server communication section 14 issues the write disable notice to the encoding section 922 (step S580).

After ending transmitting every transmission-target code data or after receiving a transmission buffer write disable notice, the transmission code generating section 923 sends the transmitted differential region data to the transmission screen data updating section 13 (S710). At this time, when the transmission-target code data includes the screen code data that has been divided, the transmission is completed when the transmission of the transmission-target code data ends which has the connection order data indicating the last position in an order. That is to say, when ending transmitting the transmission-target code data including the screen code data that has not been divided or the transmission-target code data that includes the division code data having the connection order data indicating the last position in the order, the differential region data corresponding to the transmission-target code data becomes the transmitted differential region data.

Additionally, after transmission-target code data is transmitted, the transmission code generating section 923 deletes the transmitted transmission-target code data from the transmission-target code buffer 9231. Further, the transmission code generating section 923 deletes the transmission-target code data excluding the transmission-target code data in the course of transmission, among data recorded in the transmission-target code buffer 9231. The transmission-target code data in the course of transmission means that the transmission-target code data in which the connection order data indicates the division code data in the first position (e.g. "1"), has already been transmitted, and that the same differential region data as the transmission-target code data is included. When the transmission-target code data that includes the connection order data (e.g. "1") indicating the division code data in the first position has not been transmitted yet, the transmission-target code data with the same differential region data is deleted from the transmission-target code buffer 9231.

Next, details of an operation for generating the transmission-target code data of the transmission code generating section 923 (step S600) will be described with reference to FIG. 34.

After acquiring the screen code data list with the change data density generated by the encoding section 922 (step S610), the transmission code generating section 923 checks whether any data has been written into the transmission-target code buffer 9231 (step S620). When the transmission-target code data is left in the transmission-target code buffer 9231 (step S620—present), the transmission-target code data (division code data) with the smallest connection order data is transmitted (step S622).

The transmission code generating section 923 selects the screen code data corresponding to the highest change data density from among unprocessed screen code data with change data density (step S630).

When a size of the code data of the selected screen code data is larger than the division code data size, the transmission code generating section 923 divides the code data of the selected screen code data such that the data size is the division code data size or below, to generate the division code data, and writes the division code data into the transmission code buffer 9231 (step S640). When the data size is smaller than the division code data size, the screen code data is written with the number of division of "1", namely, without division, into the transmission code buffer 9231.

Next, the transmission code generating section 923 sends a size and change data density of the code data, the division code data size, the division code data in the screen code data that has been divided, to the transmission priority calculating section 924. The transmission priority calculating section 924 calculates transmission priorities based on the sent data (step S650). The transmission code generating section 923 receives the calculated transmission priorities, and then writes them as transmission priorities of transmission-target code data written into the transmission code buffer 9231. The above process is repeated until all the screen code data included in the screen code data list with change data density are processed as the transmission-target code data and stored in the transmission code buffer 9231 (step S660).

After that, the transmission code generating section 923 sends the division code data to the server communication section 14 in descending order of transmission priority from among transmission-target code data written into the transmission code buffer 9231. Because the division code data generated as a result of division into a plurality of division code data have the same transmission priorities, the transmission-target code data with the smallest connection order data assigned to the division code data, namely, the transmission-target code data in the first position is transmitted first (step S514). At this time, it is preferable that the transmission of the division code data of the current screen be controlled such that the division code data of the previous screen that are left without being transmitted, are not transmitted later than the division code data of the newly-generated current screen.

The above-mentioned procedures will be described with specific numerical values. For example, it is assumed that differential regions A to F are extracted and priorities thereof are calculated as: 110 (region A); 200 (region B); 180 (region C); 160 (region D); 70 (region E); and 60 (region F). The transmission code generating section 923 performs division as follows based on the screen code data sizes of these differential regions: 1 (region A); 2 (region B); 3 (region C); 2 (region D); 1 (region E); and 1 (region F), and generates division codes. Therefore, the transmission priority calculating section 924 calculates the transmission priorities as: 110 (region A); 100 (region B); 90 (region C); 80 (region D); 70 (region E); and 60 (region F). The transmission-target code data is generated as follows: A (110); B1 (100); B2 (100); C1 (90); C2 (90); C3 (90); D1 (80); D2 (80); E (70); and F (60). When any data left in the transmission-target code buffer 9231 is not present and the transmission buffer write disable notice is not received from the server communication section 14, the transmission is performed in the order of A, B1, B2, C1, C2, C3, D1, D2, E, and F from the transmission code generating section 923.

When A, B1, B2, C1 are transmitted and the transmission buffer write disable notice is received after C2 is transmitted, for example, the transmission code generating section 923 deletes A, B1, B2, D1, D2, E1, and F1 from the transmission-target code buffer, and C2 and C3 are left in the transmission-target code buffer.

Next, after the transmission-target code data G(110) with the transmission priority of 110 and the number of division of 1, and the transmission-target code data. H1(100) and H2(100) with the transmission priority of 100 and the number of division of 2 are generated, C2 left in the transmission-target code buffer 9231 is transmitted. G with the high transmission priority is transmitted next, and the left C3 is transmitted thereafter, and H1 and H2 are transmitted.

The other operations are the same as in the first exemplary embodiment, and the description thereof is omitted.

Figure 35:
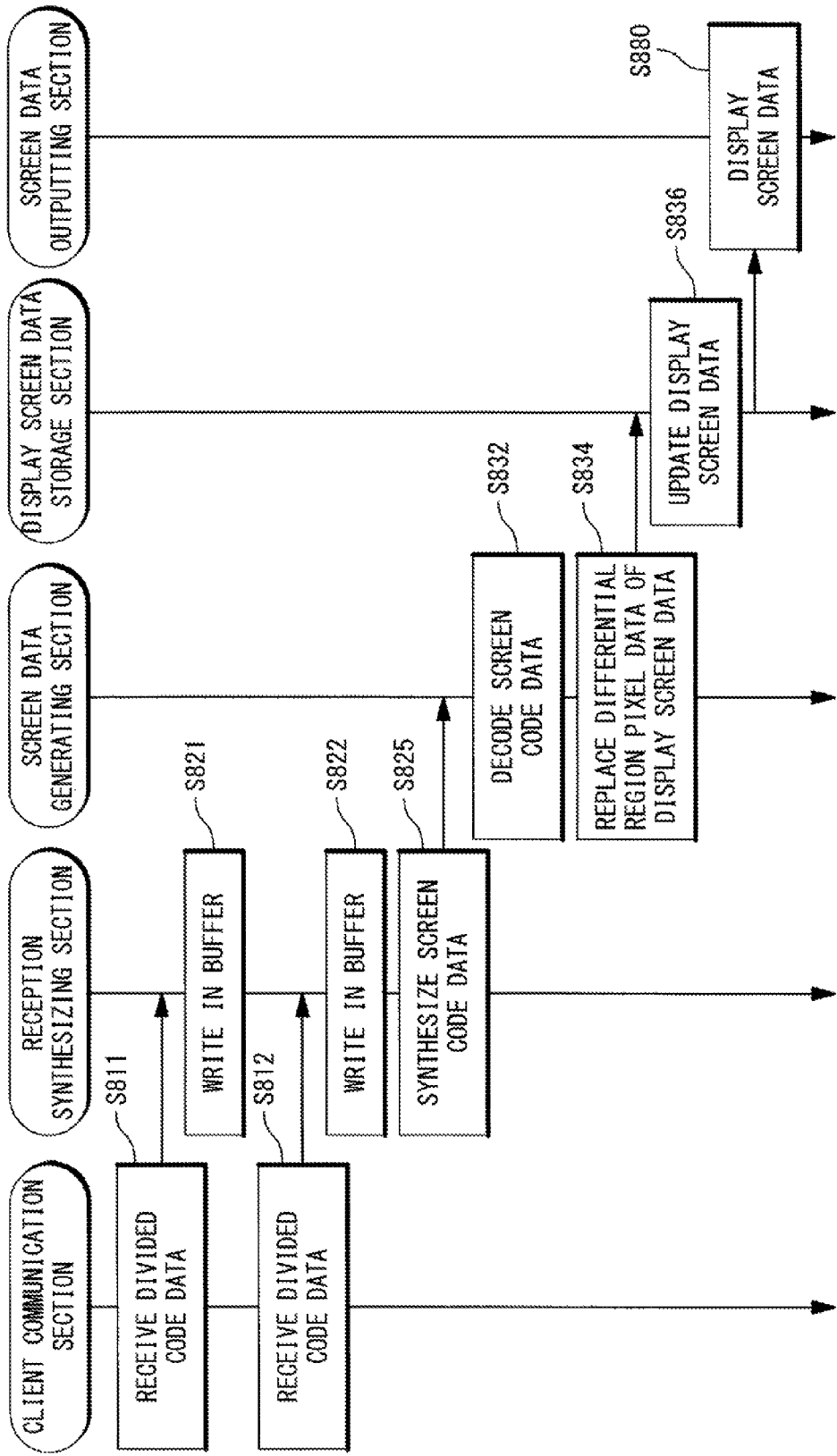
FIG. 35 is a sequence diagram showing an operation of the screen data reception client.

Next, an operation of the screen data reception client 91 of the present exemplary embodiment will be described in detail with reference to FIG. 35. Here, a difference from the first exemplary embodiment will be described.

The client communication section 33 receives the division code data or the screen code data from the screen data transmission server 92 through the network 2 (step S811). The reception code synthesizing section 911 acquires the division code data received by the client communication section 33 and stores the division code data in the reception code buffer 9111. When the division code data in which the connection order data indicates the last position in the order, or the screen code data that has not been divided is received (step S812), the reception code synthesizing section 911 stores the received data in the reception code buffer 9111 (step S822) and synthesizes the screen code data based on the received data stored in the reception code buffer 9111 (step S825). That is to say, the division code data as a result of division into several of the division code data are connected based on the connection order data and turned back to the screen code data. The reception code synthesizing section 911 gives the received screen code data to the encoding section 323.

The other operations are the same as in the first exemplary embodiment, and the description thereof is omitted.

In the present exemplary embodiment as mentioned above, the transmission code generating section 923 divides the screen code data having the code data of a larger size than the division code data size, to have the division code data size or below, and generates the division code data. The generated division code data is written into the transmission-target code buffer 9231. The transmission priority is calculated for each division code data by the transmission priority calculating section 924 based on the change data density of the screen code data, and the calculated transmission priority is provided for each transmission-target code data.

Additionally, the transmission code generating section 923 uses the change data density of the screen code data having code data of a smaller size than the division code data size, as transmission priority.

Then, the transmission code generating section 923 acquires the division code data of the transmission-target code data written into the transmission-target code buffer 9231 one by one in order of the connection order data, and transmits the division code data or the screen code data in descending order of the transmission priority in combination with the transmission-target code data having the screen code data as code data.

According to the present exemplary embodiment, through the above operation, the following effect can be obtained in addition to the effects obtained in the first exemplary embodiment. Since the screen data acquiring section 11 acquires the screen data before the screen code data having the code data of a larger size than the division code data size (giant screen code data, hereinafter) is divided into the division code data. In addition, after the division code data is transmitted and before the next division code data is transmitted, when the differential regions are extracted by the differential region extracting section 122 from the screen data acquired by the screen data acquiring section 11 and the change data density of the differential region calculated by the priority determining section 123 is a large value, it is possible to transmit the screen code data obtained by encoding image data of the differential region with the high change data density (high-change screen code data, hereinafter) after a single division code data generated from the giant screen code data is transmitted. Also, it is possible to transmit the high-change screen code data promptly, compared with the first exemplary embodiment in which the screen data acquiring section 11 acquires the screen data after the giant screen code data itself is transmitted.

That is to say, in the screen data transmitting system described in the first exemplary embodiment, an operation of the differential region extracting section is not started until ending transmission of the giant screen code data. For this reason, when a great screen change occurs, it is not possible to transmit an image data corresponding to this change. In the screen data transmitting system described in the fifth exemplary embodiment, on the other hand, an operation of the differential region extracting section is performed after the division code data obtained by dividing the giant screen code data is transmitted. For this reason, when the screen code data is obtained which has the higher change data density and a smaller transmission data size, compared with the giant screen code data, the high-change screen code data with a high transmission priority is transmitted during the transmission of the division code data of the giant screen code data, and accordingly, transmission of the high-change screen code data is completed earlier than the giant screen code data.

In this exemplary embodiment, when receiving the division code data, the reception code synthesizing section 911 in the screen data reception client 91 waits for data reception from the client communication section 33 immediately after writing the received division code data into the reception code buffer 9111. Therefore, it is possible to receive the high-change screen code data after a single division code data generated from the giant screen code data is received, and receive and decode the high-change screen code data promptly compared with the first exemplary embodiment in which the next screen code data is received after the giant screen code data itself is received.

Although a case where HTTP is used as a screen data transmission protocol has been described in the above-mentioned specific examples, other transmission protocols may be used. Additionally, although a case where pixel data is used as an example of image data, has been described, dots and line segments represented by vectors are also possible. Further, though a shape of a differential region was described as a rectangle, the shape of the differential region is not limited to this. In addition, though "(a total of change amounts)/(a square of an area of a differential region)" was used as the change data density, other values may be used if a value is smaller, and a total of change amounts of differential regions is greater, as an area of the differential region is greater.

The present invention is applicable when the screen data is transferred in a thin client system and so on, and is particularly suitable for use in the narrowband environment.

Additionally, when the present invention is realized by a computer, (1) it is preferable that a program makes the computer function as:

a differential region extracting section for comparing a previous screen and a current screen and extracting a region on the current screen that has changed from the previous screen as a differential region;

a priority determining section for determining a priority in transmission of an image data of each of the differential regions extracted by the differential region extracting section, based on predetermined criteria; and a communication section for transmitting the image data in descending order of the priorities of differential regions determined by the priority determining section.

(2) Additionally, in the program mentioned in (1), a program is possible in which the priority determining section calculates a change data density indicating a degree of change in a pixel value from the previous screen for each of the differential regions and determines the priority of each of the differential regions based on the calculated change data density.

(3) Further, in the program mentioned in (2), a program is possible in which the computer has a transmission history storage section is stored in which a transmission history of each block at the time of dividing a screen into blocks, and the priority determining section calculates a weight for the change data density of the differential regions based on the transmission histories of the blocks covered by the differential regions, and determines priorities of the differential regions based on the change data density weighted with the calculated weight.

(4) in addition, in the program mentioned in (2), a program is possible in which the priority determining section calculates the weight for the change data density of each differential region based on an operation data transmitted from the screen data reception client, and indicating contents of an operation which a user has performed for screen data, and determines the priorities of the differential regions based on the change data density weighted with the calculated weight.

(5) Additionally, in the program mentioned in any of (1) to (4), a program is possible in which the computer has a transmission buffer for temporarily holding an image data to be transmitted, and the computer is functioned as a communication rate calculating section for calculating a communication rate of the own computer, wherein the communication section determines a data size of the image data written into a transmission buffer based on the communication rate calculated by the communication rate calculating section and writes the image data of each differential region into the transmission buffer in descending order of the priority decided by the priority determining means within the decided data size.

(6) Additionally, in the program mentioned in (1), a program is possible in which the computer is further functioned as an encoding section for encoding pixel data of each differential region and generating the encoded data, and as a transmission code generating section for dividing the code data such that a size is a threshold value or below when the size of the code data is larger than the threshold value to generate the division code data, and dividing the change data density into the same number as the division code data to allot transmission priority to each division code data, and the computer is functioned such that the communication section transmits the division code data based on the transmission priorities.

(7) Additionally, in the program mentioned in (6), a program is possible in which the division code data includes a connection order data indicating order of connecting the division code data to restore the code data, and in which the computer is functioned such that the transmission code generating section selects the division code data that includes the connection order data indicating the smallest level to send the selected division code data by using the communication section; deletes the transmitted transmission-target code data; when the division code data that is firstly connected at the time of connecting the division code data to generate the screen code data, is included in division code data which could not be transmitted by the communication section, deletes the division code data that is firstly connected and each division code data that is connected after the firstly-connected division code data when the screen code data is generated; and further deletes screen code data which could not be transmitted by the communication means.

According to the present invention, the differential regions under restriction of communication bands are limited to differential regions with low priorities and hence the effect on updating of screens on the side of a screen data reception client can be reduced to a minimum.

Although the present invention has been described above with reference to the exemplary embodiments, the present invention is not limited to the above-mentioned exemplary embodiments. It could be understood that various changes which can be made by those skilled in the art to the configurations and details of the present invention are within the scope of the present invention.

The invention claimed is:

1. A screen data transmitting system comprising:
   a screen data transmission server; and
   a screen data reception client configured to generate a screen data based on image data received from said screen data transmission server and display the generated screen data on a client screen,
   wherein said screen data transmission server comprises:
   a differential region extracting section configured to compare a current screen currently displayed and a previous screen previous to the current screen, and to extract as differential regions, regions on the current screen having changed from the previous screen;
   a priority determining section configured to determine a priority based on pixel values of pixels contained in each of the differential regions and an area of the differential region for every differential region; and
   a communication section configured to transmit the image data of the differential regions in descending order of the priority.

2. The screen data transmitting system according to claim 1, wherein said priority determining section calculates a change data density indicating a degree of a change of the pixel values to the previous screen based on the pixel values and the area, and determines the priorities of the differential regions based on the change data densities.

3. The screen data transmitting system according to claim 2, wherein the change data density is calculated by dividing a total of change amounts of the pixel values by a square of the area.

4. The screen data transmitting system according to claim 2, wherein said screen data transmission server further comprises:
   a transmission history storage section configured to store a transmission history indicating for each of blocks obtained by dividing the previous or current screen that the image data in which at least a part of each of the differential regions is contained in the block have been transmitted; and
   a weight generating section configured to calculate a weight to the priority based on the transmission history for the blocks covered by the differential regions, and
   wherein said priority determining section weights the change data density with the weight to determine the priority.

5. The screen data transmitting system according to claim 4, wherein the transmission history comprises the latest transmission time indicating a time at which the image data for the differential region whose part is contained in the blocks has been transmitted last, and
   said priority determining section sets the weight such that the weight takes a larger value when a difference between the latest transmission time and the current time is larger.

6. The screen data transmitting system according to claim 4, wherein the transmission history contains a transmission frequency indicates the number of times of transmission of the image data contained in the blocks, and
   said priority determining section sets the weight such that the weight takes a larger value when the transmission frequency of the blocks covered by the differential region is smaller.

7. The screen data transmitting system according to claim 2, wherein said screen data reception client comprises:
   an operation data input section configured to transmit an operation data indicating an operation performed by a user, to said screen data transmission server, and
   said priority determining section calculates the weight based on the operation data transmitted from said screen data reception client, and weights the change data density by the weight to determine the priority.

8. The screen data transmitting system according to claim 7, wherein the operation data comprises a position of a cursor displayed on said client screen, and
   said priority determining section determines the weight such that the weight takes a larger value when a distance between a position of the differential region and the position of said cursor shown by the operation data is smaller.

9. The screen data transmitting system according to claim 7, wherein the operation data contains a movement speed of the cursor displayed on the client screen, and
   said priority determining section determines the priority without weighting by the weight when the movement speed is lower than a threshold value, and determines the priority by weighting the change data density by the weight such that the weight takes a larger value as the area is smaller, when the movement speed is equal to or higher than the threshold value.

10. The screen data transmitting system according to claim 7, wherein the operation data includes an operation frequency of a key operated by the user, and
    said priority determining section determines the priority without weighting by the weight when the operation frequency is lower than a threshold value, and determines the priority by weighting the change data density by the weight such that the weight takes a larger value as the area is smaller, when the operation frequency is equal to or higher than the threshold value.

11. The screen data transmitting system according to claim 1, wherein said screen data transmission server further comprises a transmission rate calculating section configured to calculate a transmission rate when said communication section communicates with said screen data reception client,
    said communication section comprises a transmission buffer configured to temporarily hold the image data to be transmitted to said screen data reception client, and
    a maximum data size of the image data to be written in said transmission buffer is determined based on the transmission rate, and the image data for the differential regions are written in said transmission buffer in the maximum data size or below in descending order of the priority.

12. The screen data transmitting system according to claim 1, wherein said differential region extracting section detects the pixel whose value has changed from the pixel value of the previous screen more than a pixel threshold value, and extracts as the differential region, a region covered by a set of the detected pixels, every two of which are connected by a line segment and a distance between every two of which is equal to or shorter than a distance threshold value.

13. The screen data transmitting system according to claim 1, wherein said differential region extracting section extracts said differential region based on weighted pixel values obtained by weighting color components by different weights.

14. The screen data transmitting system according to claim 2, wherein said screen data transmission server further comprises:
an encoding section configured to encode pixel data of the differential region to generate a code data; and
a transmission code generating section configured to divide the code data of a size smaller equal to or smaller than a predetermined size to generate a division code data, and relate a transmission priority obtained by dividing the change data density by a divisional number of the divisional code data to the division code data, and
said communication section transmits the division code data based on the transmission priority.

15. The screen data transmitting system according to claim 14, wherein the division code data comprises connection order data indicating an order in which the division code data is to be connected, and
said transmission code generating section selects a transmission target code data, the division code data which contains the connection order data indicating the smallest order, transmits the transmission target code data by using said communication section, deletes the transmitted transmission target code data, deletes all of the division code data when the division code data to be first connected in generation of the screen code data by connecting the division code data is contained and the division code data to be connected next to the division code data to be first connected from among the division code data which cannot be transmitted by said communication section, and deletes the screen code data which cannot be transmitted by said communication section.

16. A screen data transmission server which transmits image data for differential regions to a screen data reception client configured to generate a screen data based on the image data and display the generated screen data on a client screen, comprising:
a differential region extracting section configured to compare a current screen currently displayed and a previous screen previous to the current screen and extract as differential regions, regions on the current screen having changed from the previous screen;
a priority determining section configured to determine a priority based on pixel values of pixels contained in each of the differential regions and an area of the differential region, for every differential region; and
a communication section configured to transmit the image data for the differential regions in descending order of the priority.

17. The screen data transmission server according to claim 16, wherein said priority determining section calculates a change data density indicating a degree of a change of the pixel values to the previous screen based on the pixel values and the area, and determines the priorities of the differential regions based on the change data densities.

18. The screen data transmission server according to claim 17, further comprising:
a transmission history storage section configured to store a transmission history indicating for each of blocks obtained by dividing the previous or current screen that the image data in which at least a part of the differential regions is contained in the blocks have been transmitted; and
a weight generating section configured to calculate a weight to the priority based on the transmission history for the blocks covered by the differential regions,
wherein said priority determining section weights the change data density with the weight to determine the priority.

19. The screen data transmission server according to claim 17, further comprising:
an operation data acquiring section configured to hold an operation data indicating an operation performed by a user, and received by said screen data reception client,
wherein said priority determining section calculates the weight based on the operation data received by said screen data reception client, and weights the change data density by the weight to determine the priority.

20. The screen data transmission server according to claim 16, further comprising:
a communication rate calculating section configured to calculate a communication rate when said communication section communicates with said screen data reception client,
said communication section comprises a transmission buffer configured to temporarily hold the image data to be transmitted to said screen data reception client, and
wherein a maximum data size of the image data to be written in said transmission buffer is determined based on the communication rate, and the image data for the differential regions are written in said transmission buffer in the maximum data size or below in descending order of the priority.

21. The screen data transmission server according to claim 16, further comprises:
an encoding section configured to encode pixel data of said differential region to generate a code data; and
a transmission code generating section configured to divide the code data of a size smaller equal to or smaller than a predetermined size to generate a division code data, and relate a transmission priority obtained by dividing the change data density by a divisional number of the divisional code data to the division code data, and
wherein said communication section transmits the division code data based on the transmission priority.

22. The screen data transmission server according to claim 21, wherein the division code data comprises connection order data indicating an order in which the division code data is to be connected, and
said transmission code generating section selects a transmission target code data, the division code data which contains the connection order data indicating the smallest order, transmits the transmission target code data by using said communication section, deletes the transmitted transmission target code data, deletes all of the division code data when the division code data to be first connected in generation of the screen code data by connecting the division code data is contained and the division code data to be connected next to the division code data to be first connected from among the division code data which cannot be transmitted by said communication section, and deletes the screen code data which cannot be transmitted by said communication section.

23. A screen data transmitting method comprising:
comparing a current screen currently displayed and a previous screen previous to the current screen and extracting as differential regions, regions on the current screen having changed from the previous screen;
determining a priority based on pixel values of pixels contained in each of the differential regions and an area of the differential region, for every differential region;
transmitting image data for the differential regions in descending order of the priority; and
generating a screen data based on the image data received from a screen data transmission server and displaying the generated screen data on a client screen.

24. The screen data transmitting method according to claim 23, wherein said determining comprises:
calculating a change data density indicating a degree of a change of the pixel values to the previous screen based on the pixel values and the area, and determining the priorities of the differential regions based on the change data densities.

25. The screen data transmitting method according to claim 24, further comprising:
managing a transmission history indicating for each of blocks obtained by dividing the previous or current screen that the image data in which at least a part of the differential regions is contained in the blocks have been transmitted,
wherein said determining comprises:
calculating a weight to the change data density based on the transmission history; and
determining the priority of each of the differential regions based on the weighted change data density obtained by weighting the change data density.

26. The screen data transmitting method according to claim 24, wherein said determining comprises:
calculating the weight based on the operation data transmitted from said screen data reception client; and
determining the priority based on the weighted change data density.

27. The screen data transmitting method according to claim 23, further comprising:
temporarily holding the image data in a transmission buffer;
calculating a transmission rate of a server which transmits the image data for the differential regions,
wherein said communicating comprises:
determining a data size of the image data to be written in said transmission buffer based on the transmission rate; and
writing the image data for the differential regions in said transmission buffer in a range of the data size in descending order of the priority.

28. The screen data transmitting method according to claim 23, further comprising:
generating code data by encoding pixel data of the differential region;
generating division code data by dividing the code data of a size smaller equal to or smaller than a predetermined size when the code data size is larger than the predetermined size; and
relating a transmission priority obtained by dividing the change data density by a divisional number of the divisional code data to the division code data,
wherein said communicating comprises:
transmitting the division code data based on the transmission priority.

29. The screen data transmitting method according to claim 28, wherein the division code data comprises connection order data indicating an order in which the division code data is to be connected, and
said communicating comprises:
transmitting the division code data based on code the connection order data.

30. A computer-readable recording medium in which a computer-executable program code is stored to make a computer to execute a screen data transmitting method which comprises:
comparing a current screen currently displayed and a previous screen previous to the current screen and extracting as differential regions, regions on the current screen having changed from the previous screen;
determining a priority based on pixel values of pixels contained in each of the differential regions and an area of the differential region, for every differential region;
transmitting image data for the differential regions in descending order of the priority; and
generating a screen data based on the image data received from a screen data transmission server and displaying the generated screen data on a client screen.

31. A screen data reception client comprising:
a section configured to receive image data for differential regions;
a generating section configured to generate a screen data based on the received image data for the differential regions; and
a client screen configured to display the generated screen data,
wherein a current screen currently displayed and a previous screen previous to the current screen are compared, regions on the current screen having changed from the previous screen are extracted as the differential regions, a priority is determined based on pixel values of pixels contained in each of the differential regions and an area of the differential region for every differential region, and the image data for the differential regions are transmitted in descending order of the priority.

32. A screen data transmitting method comprising:
comparing a current screen currently displayed and a previous screen previous to the current screen and of extracting as differential regions, regions on the current screen having changed from the previous screen;
determining a priority based on pixel values of pixels contained in each of the differential regions and an area of the differential region, for every differential region; and
transmitting the image data for the differential regions in descending order of the priority.

33. A computer-readable recording medium in which a computer-executable program code is stored to make a computer to executed a the screen data transmitting method which comprises:
comparing a current screen currently displayed and a previous screen previous to the current screen;
extracting as differential regions, regions on the current screen having changed from the previous screen;
determining a priority based on pixel values of pixels contained in each of the differential regions and an area of the differential region, for every differential region; and
transmitting the image data for the differential regions in descending order of the priority.

34. A screen data receiving method comprising:
receiving image data for differential regions; and
generating a screen data based on the received image data for the differential regions and displaying the generated screen data,
wherein a current screen currently displayed and a previous screen previous to the current screen are compared, regions on the current screen having changed from the previous screen are extracted as the differential regions, a priority is determined based on pixel values of pixels contained in each of the differential regions and an area of the differential region for every differential region, and the image data for the differential regions are transmitted in descending order of the priority.

35. A computer-readable recording medium in which a computer-executable program code is stored to make a computer to execute a screen data receiving method which comprises:
receiving image data for differential regions; and
generating a screen data based on the received image data for the differential regions and displaying the generated screen data,
wherein a current screen currently displayed and a previous screen previous to the current screen are compared, regions on the current screen having changed from the previous screen are extracted as the differential regions, a priority is determined based on pixel values of pixels contained in each of the differential regions and an area of the differential region for every differential region, and the image data for the differential regions are transmitted in descending order of the priority.

* * * * *